(12) United States Patent
DeLollis et al.

(10) Patent No.: US 12,319,411 B1
(45) Date of Patent: Jun. 3, 2025

(54) DRONE DEPLOYABLE MODULAR SYSTEM FOR REMOTE SOLAR ENERGY GENERATION

(71) Applicant: Apsara Energy LLC, New York, NY (US)

(72) Inventors: Andrew DeLollis, Andover, MA (US); Robert Mitchell Jones, Avon, MA (US); Borys Shtangeyev, Needham, MA (US); Ben Pedtke, Leominster, MA (US); Ravi Ashok Jeyaratnam, New York, NY (US)

(73) Assignee: Apsara Energy LLC, New York, NY (US)

( * ) Notice: Subject to any disclaimer, the term of this patent is extended or adjusted under 35 U.S.C. 154(b) by 945 days.

(21) Appl. No.: 17/170,419

(22) Filed: Feb. 8, 2021

Related U.S. Application Data

(60) Provisional application No. 62/971,689, filed on Feb. 7, 2020.

(51) Int. Cl.
*B64D 1/22* (2006.01)
*A01G 9/24* (2006.01)
(Continued)

(52) U.S. Cl.
CPC ............... *B64D 1/22* (2013.01); *B64U 10/14* (2023.01); *B64U 70/92* (2023.01); *B64U 70/97* (2023.01);
(Continued)

(58) Field of Classification Search
CPC .......... B64D 1/22; B64U 10/14; B64U 70/92; B64U 70/97; B64U 50/19; B64U 2101/60;
(Continued)

(56) References Cited

U.S. PATENT DOCUMENTS 4,172,443 A * 10/1979 Sommer ................ F24S 50/20
353/3
4,192,583 A * 3/1980 Horton .................. G01S 3/7861
353/3

(Continued)

OTHER PUBLICATIONS

Schiller "Could Solar-Powered Drones Deliver Electricity To The Developing World?" https://www.fastcompany.com/3056336/could-solar-powered-drones-deliver-electricity-to-the-developing-world (Year: 2016).*

(Continued)

*Primary Examiner* — George G. King
(74) *Attorney, Agent, or Firm* — Barnes & Thornburg LLP

(57) ABSTRACT

A drone deployable modular system for remote solar energy generation utilizes remote-controlled multi-rotor drones configured to deliver and maintain modular heliostat units for assembly into heliostat fields in remote locations. The drone deployable modular heliostat unit may include a frame that supports at least one deployable, mirrored surface controlled by a heliostat driver. In one embodiment, the deployable, mirrored surface is a MYLAR film tensioned over a mirror frame portion supported and controlled by the heliostat driver to orient a working face of the mirrored surface in various positions. The drone deployable modular heliostat unit may include a deployable stand arrangement and/or an anchor system. The modular heliostat units may be configured to be deployed in heliostat fields in a generally peripheral arrangement to provide reflected solar energy to a centrally located concentrating solar collector/energy utilization system.

13 Claims, 26 Drawing Sheets

(51) Int. Cl.
*B64U 10/14* (2023.01)
*B64U 50/19* (2023.01)
*B64U 70/92* (2023.01)
*B64U 70/97* (2023.01)
*B64U 101/60* (2023.01)
*F24S 23/70* (2018.01)
*F24S 30/45* (2018.01)
*F24S 40/20* (2018.01)
*H02S 20/30* (2014.01)
*H02S 40/10* (2014.01)
*H02S 40/22* (2014.01)

(52) U.S. Cl.
CPC .............. *H02S 40/22* (2014.12); *A01G 9/243* (2013.01); *B64U 50/19* (2023.01); *B64U 2101/60* (2023.01); *F24S 2023/878* (2018.05); *F24S 30/45* (2018.05); *F24S 40/20* (2018.05); *H02S 20/30* (2014.12); *H02S 40/10* (2014.12)

(58) Field of Classification Search
CPC .......... H02S 40/22; H02S 20/30; H02S 40/10; A01G 9/243; F24S 30/45; F24S 40/20; F24S 2023/878
USPC ........................................... 359/853; 224/538
See application file for complete search history.

(56) References Cited

U.S. PATENT DOCUMENTS

| | | | |
|---|---|---|---|
| 4,227,513 A * | 10/1980 | Blake | F24S 23/77 353/3 |
| 5,184,502 A | 2/1993 | Adams et al. | |
| 5,347,402 A * | 9/1994 | Arbogast | F24S 23/77 359/853 |
| 7,105,940 B2 | 9/2006 | Weesner et al. | |
| 7,230,819 B2 | 6/2007 | Muchow et al. | |
| 8,212,142 B2 | 7/2012 | Lyman et al. | |
| 8,365,719 B2 | 2/2013 | Caldwell | |
| 8,792,227 B2 | 7/2014 | Prax et al. | |
| 9,048,780 B2 | 6/2015 | Caster et al. | |
| 9,384,668 B2 | 7/2016 | Raptopoulos et al. | |
| 9,422,922 B2 | 8/2016 | Sant'Anselmo et al. | |
| 9,457,463 B2 | 10/2016 | Tadayon | |
| 9,545,852 B2 | 1/2017 | Streett | |
| 9,623,760 B2 | 4/2017 | Wang et al. | |
| 9,745,165 B2 | 8/2017 | Naoi et al. | |
| 9,766,122 B2 | 9/2017 | Cothuru et al. | |
| 10,399,676 B2 | 9/2019 | Dahlstrom | |
| 10,403,155 B2 | 9/2019 | Kimchi et al. | |
| 10,439,550 B1 | 10/2019 | Goodman | |
| 2010/0087139 A1 | 4/2010 | Glass | |
| 2010/0252085 A1 | 10/2010 | Gotthold et al. | |
| 2013/0087139 A1 | 4/2013 | Kroyzer et al. | |
| 2014/0238467 A1 | 8/2014 | Martin et al. | |
| 2016/0121673 A1* | 5/2016 | Hutson | B64C 39/024 244/62 |
| 2017/0011338 A1 | 1/2017 | Stenneth et al. | |
| 2017/0210470 A1 | 7/2017 | Pardell | |
| 2018/0148170 A1* | 5/2018 | Stamatovski | B64U 80/25 |
| 2019/0134822 A1 | 5/2019 | Clemenzi et al. | |
| 2023/0091829 A1* | 3/2023 | Brost | H02S 40/22 382/154 |

OTHER PUBLICATIONS

Rohr "The Promise of Small Heliostats" Northeast Sun, Spring 2009, pp. 7-12 (Year: 2009).*

Avitan "Autonomous drones make solar projects more productive, cost-effective and secure" Solar Power World, Jan. 2020 (Year: 2020).*

* cited by examiner

DRONE DEPLOYABLE MODULAR SYSTEM FOR REMOTE SOLAR ENERGY GENERATION

FIELD OF THE INVENTION

The present disclosure relates generally to methods and systems for providing mobile energy generation systems. More particularly, the present disclosure relates to a drone deployable modular system for remote solar energy generation and associated control and utilization units.

BACKGROUND OF THE INVENTION

Mobile energy generation systems are useful in various emergency and remote applications. When the units for such systems are above the size and weight that can be carried by an individual, the units generally are designed to be transported by truck or trailer to a desired location. Examples of such ground transportable deployable energy generation systems are shown in U.S. Pat. Nos. 7,105,940 and 9,422,922, and U.S. Publ. Appl. Nos. 2014-0238467A1 and 2019-0134822A1.

Some modular energy generation systems have been designed to allow for deployment by air. Typically, the air deployment uses a helicopter to carry some form of a larger container or skid by a cable-sling arrangement having connections to each corner of the container and a hook arrangement for connecting the cables to the helicopter. Examples of such cable-sling arrangements for air-transportation of modular energy generation systems are shown in U.S. Pat. Nos. 5,184,502, 7,230,819, 8,212,142, 8,792,227, and 9,048,780.

Most modular solar energy systems use photovoltaic cells arranged as solar cell panels to generate electricity, either alone or in combination with other kinds of non-solar modular energy generation units. Another form of solar energy system is a heliostat that uses mirrors or reflectors to concentrate solar energy typically by repositioning the heliostat to track the sun. Heliostats can then use the concentrated solar energy for thermal and/or electrical energy generation. Examples of a conventional heliostat energy generation field that incorporates an array of heliostats installed in a fixed arrangement are shown in U.S. Pat. Nos. 8,365,719, 9,457,463 and 9,766,122 and U.S. Publ. Appl. Nos. 2010-0087139A1, 2010-0252085A1, and 2013-0087139A1.

Deployment and maintenance of a heliostat field in different remote locations is more complicated than installation and maintenance of a conventional heliostat generation field in a fixed and accessible location. Although aerial remote monitoring, repositioning and cleaning of a heliostat field has been described in U.S. Pat. Nos. 9,766,122 and 10,439,550 and U.S. Publ. Appl. No. 2017-0210470A1, aerial deployment of modular solar energy units has been used only in the context of the large, standardized container modules transported by the cable-sling techniques described above.

Remote control drones and related support and deployment systems have been developed for various uses, including delivery of light weight packages and payloads as described, for example, in U.S. Pat. Nos. 9,623,760, 9,545,852, 9,384,668, 9,745,165 and 10,403,155 and U.S. Publ. Appl. No. 2017-001133A1. Remote control drones have been used for cleaning and adjusting heliostats as described, for example, in U.S. Pat. Nos. 10,399,676, and 10,439,550 and U.S. Publ. Appl. No. 2017-0210470A1.

In the context of drone deployment of units for remote solar energy generation and associated control and utilization, there are significant size, weight, control and range constraints that make the use of conventional remote control drones and/or heliostats unsuitable for this task. Accordingly, there is an opportunity to improve on the design and operation of remote control drones to better facilitate remote control drone deployment of a heliostat system for remote solar energy generation and usage.

SUMMARY OF THE INVENTION

A drone deployable modular system for remote solar energy generation utilizes remote-controlled multi-rotor drones configured to deliver and maintain modular heliostat units for assembly into heliostat fields in remote locations in accordance with various embodiments as disclosed. In various embodiments, the multi-rotor drones are battery powered rechargeable vertical take-off and landing (VTOL) craft having typical flight durations of between 10-60 minutes with total travel ranges of 1-20 km; and the modular drone deployable heliostat units weigh between 1-20 kg and related drone deployable payloads weigh between 1-100 kg and are configured with an attachment mating mechanism to be releasably attached to the drones. The modular heliostat units are deployed and/or maintained in heliostat fields in a generally peripheral arrangement to provide reflected solar energy to a centrally located concentrating solar collector/energy utilization system.

In embodiments, the drone deployable modular heliostat unit includes a frame that supports at least one deployable, mirrored surface controlled by a heliostat driver. In some embodiments, the drone deployable modular heliostat unit may include a deployable stand arrangement. In some embodiments, the drone deployable modular heliostat unit may include an anchor system. In other embodiments, the drone deployable heliostat solar unit may include an anchor attachment mechanism to connect with pre-deployed anchor stations in a heliostat field.

In embodiments, the modular heliostat units may range up to 3 m in each dimension. In one embodiment, the deployable, mirrored surface is a MYLAR film tensioned over a mirror frame portion supported and controlled by the heliostat driver to orient a working face of the mirrored surface in various positions. In embodiments, the positions may include a home position that is generally horizontal to minimize wear and/or wind resistance, such as during high winds, and various operational positions in which the working face of the mirrored surface is oriented by the heliostat driver in altitude and azimuth directions within a range of 0-100 degrees and 0-360 degrees, respectively. In some embodiments, the modular heliostat units include a pair of mirrored surfaces each having a diameter of approximately 1m that are positioned by the heliostat driver in a generally vertically-oriented transport position on opposite sides of a frame structure that extends above the height of the mirror surfaces to be interfaced with the drone.

In embodiments, a universal drone attachment mechanism is provided for attaching the drone to payloads such as the drone deployable modular heliostat units. In various embodiments, the universal drone attachment mechanism requires neither a high degree of precision alignment in order to couple, nor electrical or other power to maintain its firm grip during transport, and that it allows for minimal movement of the payload being lifted relative to the drone. In one embodiment, a lifting mechanism in the form of a knob that is attached to the payload being transported mates with a gripper that is attached underneath the drone. The lifting mechanism may be a circular knob with its edge beveled downward, which makes up the top part of a lifting adapter. In one embodiment, the lifting mechanism includes a telescopic and/or rotatable shaft that can be extended, retracted and/or rotated to position the perch above or below a distance greater than one-half the maximum dimension of the mirrored surfaces of the modular heliostat unit such that the payload can be carried or anchored from a point beyond the maximum dimensions of the mirrored surface.

In embodiments, there may be a pair of jaws on the drone or as part of an anchor system that have a complimentary bevel angle and are moved by an electric linear actuator that can open and close them. In this embodiment, the two jaws and the actuator are free to pivot. For the drone, this arrangement allows the payload to maintain a relatively neutral center of gravity position with respect to the drone during transport. For an anchor system, this arrangement allows for some degree of accommodation of the modular heliostat unit in response to environmental forces, such as wind. In one embodiment, a centration device is provided as a mechanical mechanism to ensure that the gripper jaws are sufficiently positioned around the knob to maintain a grip on the knob, thereby carrying the payload during deployment or retaining the modular heliostat unit during high winds.

In embodiments, the drone has a lower portion with legs/centering structure of sufficient length and shape to interface with respect to corresponding cones built into a landing pad and/or with respect to the heliostat stand structure. In one embodiment, the stand structure is a horizontally-oriented tubular cross structure and the legs extending from the bottom part of the drone are configured in a triangular geometry that will inherently center the drone on a perch structure as the drone descends toward the heliostat stand structure. The gripper knob is mounted in the center of the cross-shaped perch of a heliostat stand as the payload. When the gripper is actuated, the drone is securely drawn down and locked onto the perch. The drone can either power down and remain on the perch, or the drone can take off and lift the modular heliostat unit or other payload unit.

In embodiments, a modular heliostat unit may include one or more heliostat mirrored surfaces operably attached to a stand structure via a heliostat driver mechanism. In various embodiments, the stand structure is a relatively lightweight frame structure constructed from tubes or struts joined together via fasteners, clamping mechanisms, adhesives, or other known forms of attachment and connection. In embodiments, each stand structure has a perch oriented at the top of the structure to allow the drone to land on the stand, pick it up, and drop it off at the desired location. Each heliostat driver mechanism generally consists of a body housing gears, motors, a computer, battery, and a mounting point for the mirrored surface. In embodiments, when the heliostats are being transported by the drone in a transport configuration, the mirrored surfaces are oriented perpendicularly to the ground to avoid disturbing the flow of air from the vehicle's propellers. Once the heliostat units are placed in the heliostat field, the mirror surfaces are moved to their "home" position in a deployed configuration, with the mirror parallel to the ground.

In embodiments, a cleaning module is used to periodically remove environmental contamination that reduces the reflectivity of the mirror surfaces of the modular heliostat unit. The cleaning module is located at the central staging area and gets power from the generation apparatus like the other central modules. In embodiments, the cleaning module includes a landing area associated with a conveyor belt that is wide enough to carry an assembled heliostat unit. The cleaning module has an enclosure in the middle, with two vertical doors on either side. The conveyor belt runs through the enclosure, so that a heliostat can be dropped off on one side by drone, conveyed into the enclosure with the doors open, washed inside the enclosure with the doors closed, and then conveyed out to the other side to be picked up again by drone. In embodiments, the cleaning apparatus inside the enclosure uses a series of directed water jets that spray directly onto the mirrors. After this, compressed air is sprayed on the mirrors to dry them. The water drains down into a collection pan in the bottom of the enclosure, is filtered, and reused. A tank of replacement water is used only to compensate for evaporative losses, which are minimized thanks to the well-sealed cleaning chamber.

Various other embodiments and configurations are described, including embodiments in which the energy utilization modules include modules containing data server computers, as well as intensive, high-density agricultural modules with artificial lighting, irrigation, and a controlled atmosphere. As in the case of the data server farm modules, the plant growing operation can economize by using electricity at the point of generation, before transmission losses.

Figure 1A:
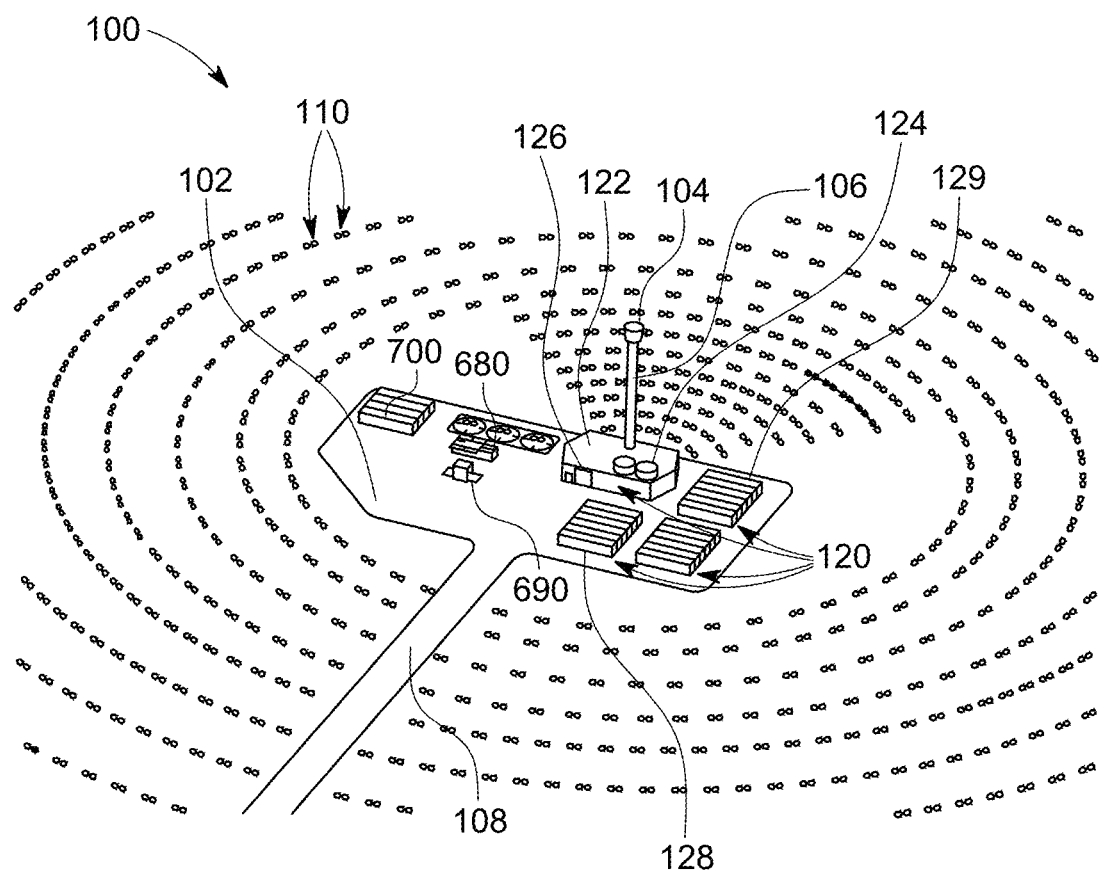
FIG. 1A illustrates a perspective view of an embodiment of a concentrating solar collector/energy utilization system assembled from the drone deployable modular heliostat units.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE EMBODIMENTS

As shown in FIG. 1, a concentrating solar collector/energy utilization facility 100 works by using a number of controlled reflectors in the form of modular heliostats units 110 to concentrate light onto a central heat collector 104 that is elevated on a transportable central tower 106 and operably connected to various associated process/utilization equipment 120. Conventionally, the heat generated from the reflected and concentrated light at the central heat collector 104 is collected for the purpose of being converted into electrical energy via steam condensers 122, steam tank 124, and turbine 126. Alternatively, and/or conjunctively, the heat may be used to directly power various other kinds of known machinery or thermal processes via process/utilization equipment 120, such as server farm modules 128 and plant cultivation modules 129.

The thermal energy from the light concentrated at the collector 104 is most commonly used to increase the temperature of a working fluid that is piped up and down the tower in a closed loop, and used to heat up water to create steam that then turns one or more turbines coupled to electrical generators. In conventional solar concentration power stations, the electricity generated at the turbines is stepped up in voltage and fed into the electrical grid via numerous transmission lines. Because the transmission line infrastructure that is connected to a conventional solar concentration power station must be permanently installed, there is no need for the design of such conventional solar facilities to be anything other than similarly immovable and permanent.

In contrast, the heat collected by the concentrating solar collector/energy utilization facility 100 in accordance with the various embodiment of the present disclosure lends itself to flexible utilization for not only for electrical generation, but also other thermal machinery and processes. In various embodiments a drone deployable heliostat field 112 and a transportable central tower 106 and associated process/utilization equipment 120 may be designed to be disassembled, relocated, and reassembled such that the system may be deployed and/or maintained in at least in a partially automated fashion.

Unbound from the grid, a portable facility such as facility 100 can use concentrated heat in two ways: to directly feed a chemical process, and to create electricity to be used locally, rather than to be fed into the grid. For example, solar furnaces have been in experimental use for decades and have been constructed to develop temperatures between 1000 and 3000 degrees C. to use for purposes such as metals refining, materials testing, producing hydrogen by cracking methane, and creating nanomaterials. These solar furnaces have been purpose-built, permanent structures, just like their electricity-generating counterparts. By contrast, the modular facility would allow for transforming the facility from one function to a different one either by moving the heliostat field between different permanent central structures, or by changing out the modular center collector 104 and processing/utilization structures 120. For example, a facility that is set up for metal processing could be converted to another use by removing and/or replacing the processing structure 120 with different modules.

In addition to direct process utilization of heat, local electricity use is an attractive application for the modular solar facility 100 in accordance with various embodiments. Instead of injecting power into the grid, with its associated transmission losses, the modular solar facility 100 can use the electrical power on site for economically profitable purposes. Thus, the modular solar facility 100 can be sited in truly remote locations where a grid connection would be infeasible. Wired to an electrical generation system similar to those in conventional concentrating solar plants but portable in construction, a variety of similarly portable "energy use modules" 120 could be built for a number of different purposes. One of these uses could be for data centers. Power-hungry servers and associated equipment can operate more economically by using electricity at its point of generation.

Figure 1B:
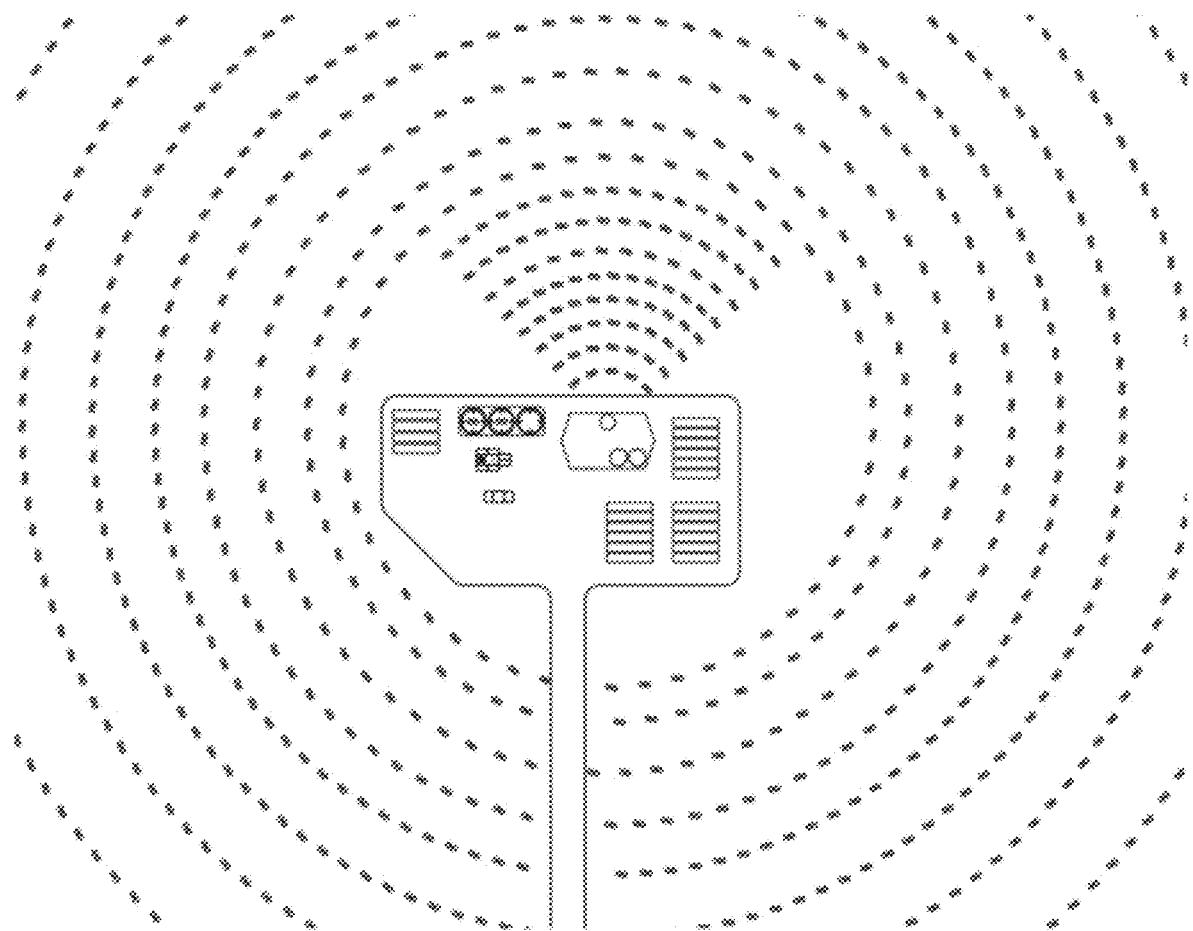
FIG. 1B illustrates a top plane view of an embodiment of a heliostat field for the concentrating solar collector/energy utilization system of FIG. 1A.
Figure 1C:
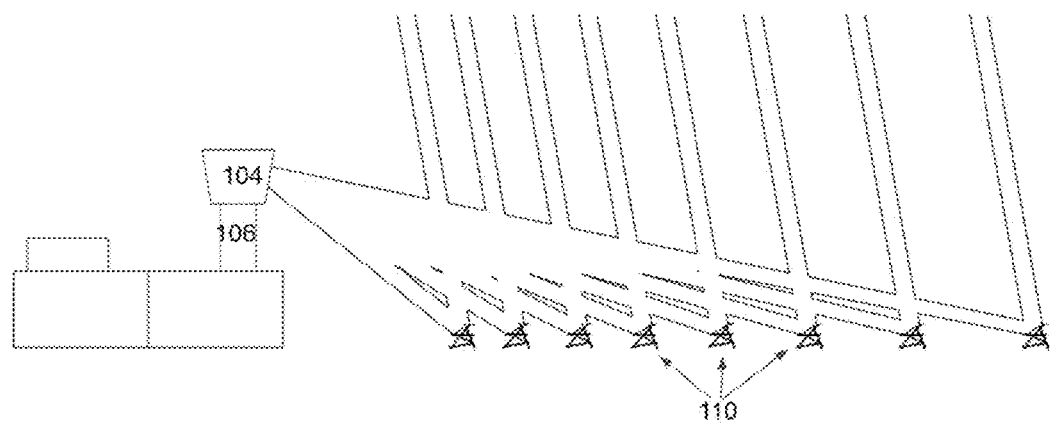
FIG. 1C illustrates a side view of an embodiment of a heliostat field for the concentrating solar collector/energy utilization system of FIG. 1A.

As shown in FIGS. 1A and 1C, the collector 104 is elevated on a tower 106 that is typically positioned near the middle of a central area 102 of modular solar system 100. In some embodiments, the location of facility 100 may be accessible by a road or land access 108. In other embodiments, the location of facility 100 may be more remote with the process/utilization components 120 and the central tower 106 and collector 104 being flown in for initial set up by helicopter, for example.

As shown in FIGS. 1B and 1C, the heliostat units 110 are arranged as a heliostat field 112 around some or all of the periphery of the central area 102. In embodiments, the heliostat field 112 is generally arranged in a configuration of multiple concentric rings. In other embodiments (not shown), the heliostat field 112 may be arranged in arrays of rows or columns. In various embodiments, the tower 106 could be between 10 and 300 meters tall depending on the size of the facility 100. Depending upon the height of the tower 106 and configuration of the concentrating optical elements in the collector 104, an array of heliostats units 110 may be deployed in multiple rings around that are closer to the tower 106 to be placed nearer to each other without blocking the reflections from other heliostat units 110. In rings that are further away from the tower 106, the heliostat units may be positioned in alternating or interleaved positions to minimize interference with lower angle optical trajectories for rings situated further away from the tower 106, as illustrated in FIG. 1C.

In some embodiments, the drone deployable modular heliostat unit 110 may include an anchor system 114 such as an integrated weight or one or more deployable anchor screws to be driven into the ground. In other embodiments, the drone deployable heliostat solar unit 110 may include an anchor attachment mechanism 116 to connect with pre-deployed anchor stations in a heliostat field. In some embodiments, during an initial set up of facility 100, more anchor stations than heliostat solar units 110 may be set up in predetermined configurations to allow the heliostat units 110 to be moved on a seasonal basis, for example, between anchor stations in order to better optimize light collection based on seasonal variation of the trajectory of the sun over the site of facility 100. In some embodiments, central tower 106 may be mounted on a crawler robot to allow repositioning of collector 104 to a more favorable position within the center area 102 based on a new seasonal configuration of the heliostat field 112.

Along with modular design, automation is utilized for various embodiments of the modular solar system facility 100. In various embodiments, the modular heliostat units 110 weigh between 5 and 20 kilograms and are configured with an attachment mating mechanism to be releasably attached to the drones. In various embodiments, the multi-rotor drones are battery-powered rechargeable vertical take-off and landing (VTOL) craft having flight durations and round-trip distances of between 5 and 10 kilometers. In embodiments, the deployment and maintenance of the heliostat field, via drones, is accomplished from a single staging area with road access 108. This single road 108 can also be used to deliver the larger tower 106 and processing modules 120. The majority of the territory therefore does not need to be improved to allow wheeled vehicle access. The staging of a solar generation site on unimproved ground reduces the cost and construction time of the facility 100.

The ability to move heliostats with drones has other benefits in terms of both initial investment and continued labor costs. Conventionally, heliostats are designed to be permanently installed, with a lifetime of 10-20 years. They must be able to withstand the worst wind and weather that they will encounter during this time, and therefore need to be rugged and expensive. In some embodiments, robotically deployed heliostats units can be designed to be returned to a storage module by the drones to be stowed when very high winds or precipitation are predicted. Thus, the heliostat units do not need to be designed to the same level of ruggedness as their permanently-installed counterparts. Robotic portability also allows for seasonal optimization of the heliostat field. The layout and heliostat spacing in a permanently installed heliostat field represents a compromise. At any particular time of the year, there would be an optimal heliostat layout that takes into account the path the sun traces across the sky on that particular day. On a summer day when the sun rises high in the sky, for instance, heliostats could be spaced closer together without shading each other. The drone-deployed solar field allows for continuous seasonal optimization of the field.

In other embodiments, the drone-deployable heliostat units enable periodic recovery and cleaning of the mirrored surfaces. As contamination builds up on the mirrors, this reduces their reflectivity and the efficiency of the solar facility. In fact, cleaning mirrors is the major labor cost in conventional solar facilities. In embodiments of the mobile solar facility 100, the drones can be scheduled to periodically retrieve each modular heliostat unit from its field position in the heliostat field and drop the heliostat unit off on a landing arrangement that can include a conveyor belt that takes the heliostat unit with its mirrored surface through an automated washing process as described herein. In other embodiments, the modular storage units are equipped with extra heliostat units that may be accessed and deployed by the drones to replace failed or damaged units. In some embodiments, the heliostat units are retrieved for cleaning during nighttime hours to reduce impact on the operating efficiency of the facility. In other embodiments, the heliostat units are replaced with spare units in a rotating fashion as each deployed heliostat unit is retrieved for cleaning.

In various embodiments, the drone-deployed solar facility 100 includes a universal attachment mechanism to mate the drone with a payload and/or to mate the payload with an anchor system. The requirements for an attachment mating mechanism suitable for use on a drone are that it not require a high degree of precision alignment in order to couple, that it require no electrical or other source of power to maintain its firm grip during transport, and that it allows for minimal movement of the payload being lifted relative to the drone.

In embodiments, the lifting mechanism includes a knob that is attached to the cargo being transported 110 or 506, and a gripper 502 that is attached underneath the drone. The cargo side of the lifting mechanism consists of a circular knob 501 with its edge beveled downward at a 45 degree angle, which makes up the top part of the lifting adapter. On the drone side, there are two jaws 503 and 504 that have a complimentary bevel angle. The jaws have an electric linear actuator 505 that can open and close them, but the two jaws and the actuator are free to pivot. As illustrated in FIGS. 9A-9C and FIGS. 10A-10B, with one closing movement of the actuator 505, the jaws 503 and 504 both secure themselves around the knob 501 and draw it and the cargo 506 firmly upward against an elastic pad. Once the jaws are in the closed position, they are fully locked against opening, and require no electrical power to remain closed and locked. Unlike with a lifting eye, the rotational orientation of the drone/gripper in this embodiment does not matter. The cargo can be placed in any rotational orientation. The jaws can successfully grip the knob even when there is significant lateral and angular misalignment between them. The jaws pivot together as they close, which allows them to automatically adjust themselves around the knob, wherever it happens to be.

Figure 11:
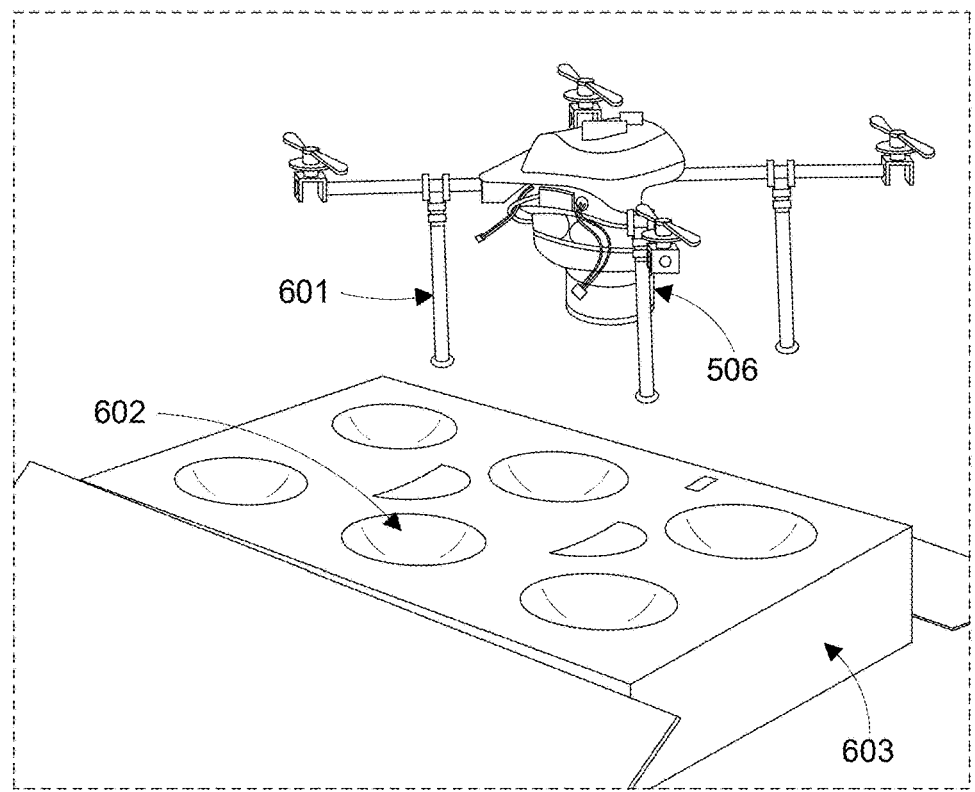
FIG. 11 illustrates a perspective view of a centration mechanism in accordance with an embodiment.
Figure 12:
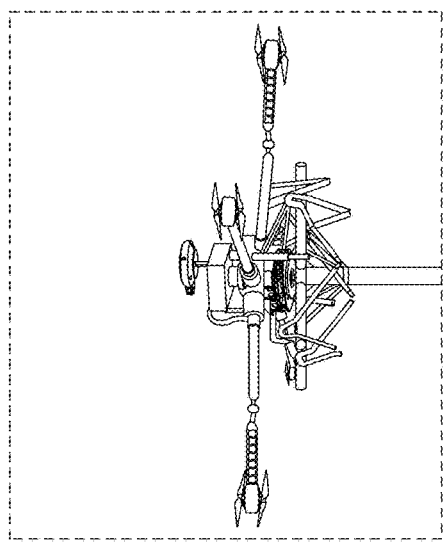
FIG. 12 illustrates a perspective, time-lapse view of a centration mechanism in accordance with an embodiment.
Figure 12:
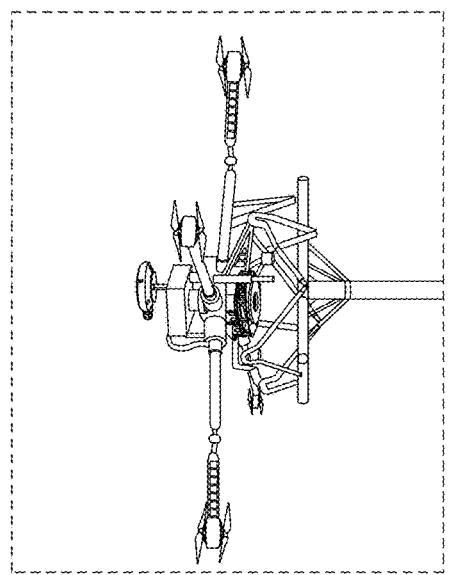
Figure 12:
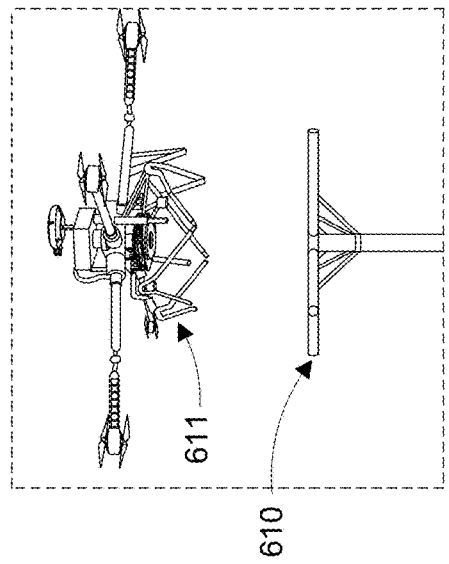

In embodiments, a centration device is another element of the drone lifting equipment. Its purpose is to provide a mechanical means to ensure that the gripper jaws are sufficiently positioned around the knob to grip it. In one embodiment, shown in FIG. 11, which is most useful for transporting smaller items, the drone has legs 601 of sufficient length and shape to interface with corresponding cones 602 built into a landing pad 603. In the embodiment used on each heliostat stand, shown in operation in FIG. 12, all that is required is a horizontally-oriented tubular cross structure 610, which can be built into the heliostat stand structure. The bottom part of the drone has triangular geometry 611 built into it that centers the drone on the cross 610 as it descends. The gripper knob 501 is mounted in the center of the cross-shaped perch 610. When the gripper 502 is actuated, the drone is securely drawn down and locked onto the perch 610. The drone can either power down and remain on the perch, or the drone can take off and lift the heliostat or whatever other item the perch is attached to.

In embodiments, one or multiple heliostats may be attached to a stand constructed from tubes via a clamping mechanism. A unique feature of each of these stands is that it has a perch 610 for a drone. This allows the drone to land on the stand, pick it up, and drop it off at the desired location. Each heliostat mechanism, shown in FIGS. 6A and 6B, generally consists of a body or housing 650, two sets of worm gears 651 and 652, two motors 653 and 654, a computer 655, a battery 656, a mounting point 658 for the stand and a mounting point 657 for a mirror. In embodiments, the body of the heliostat driver unit may be 250-1000 cc, containing the motors, gears, computer, and battery. In embodiments, the heliostat mechanism may include an option photovoltaic cell to recharge the battery 656.

Figure 2A:
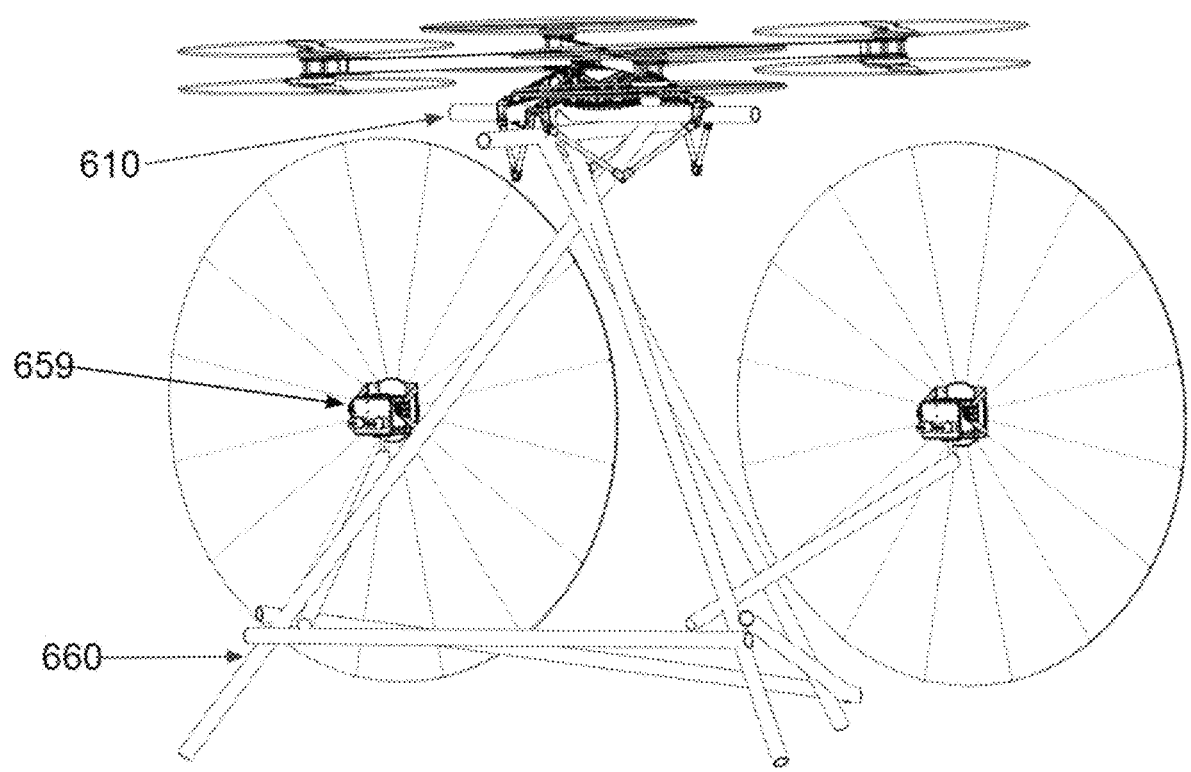
FIG. 2A illustrates a perspective view of a modular heliostat unit in accordance with an embodiment in a transport configuration.
Figure 2B:
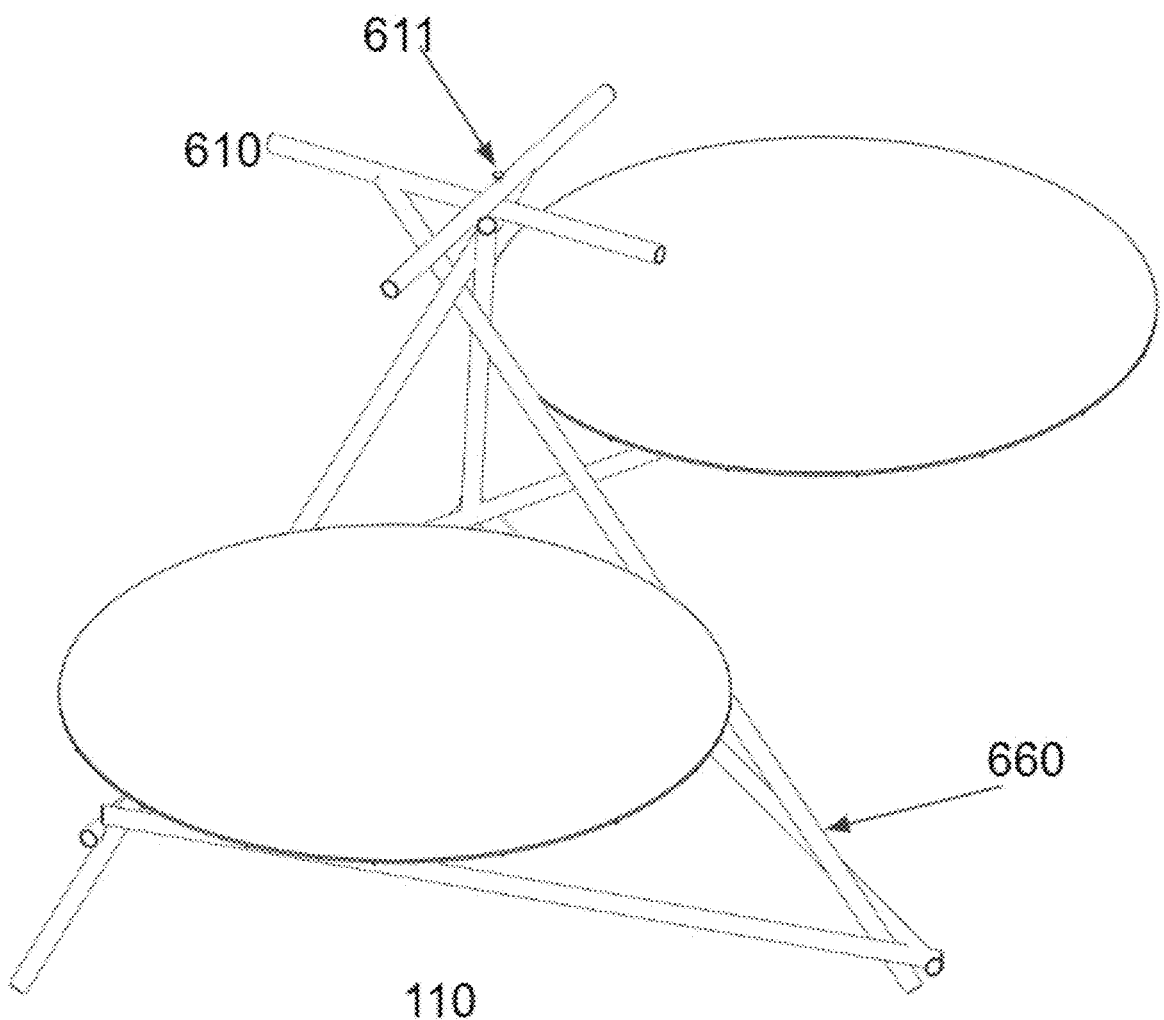
FIG. 2B illustrates a perspective view of a modular heliostat unit in accordance with an embodiment in a deployed "home" position configuration.
Figure 4A:
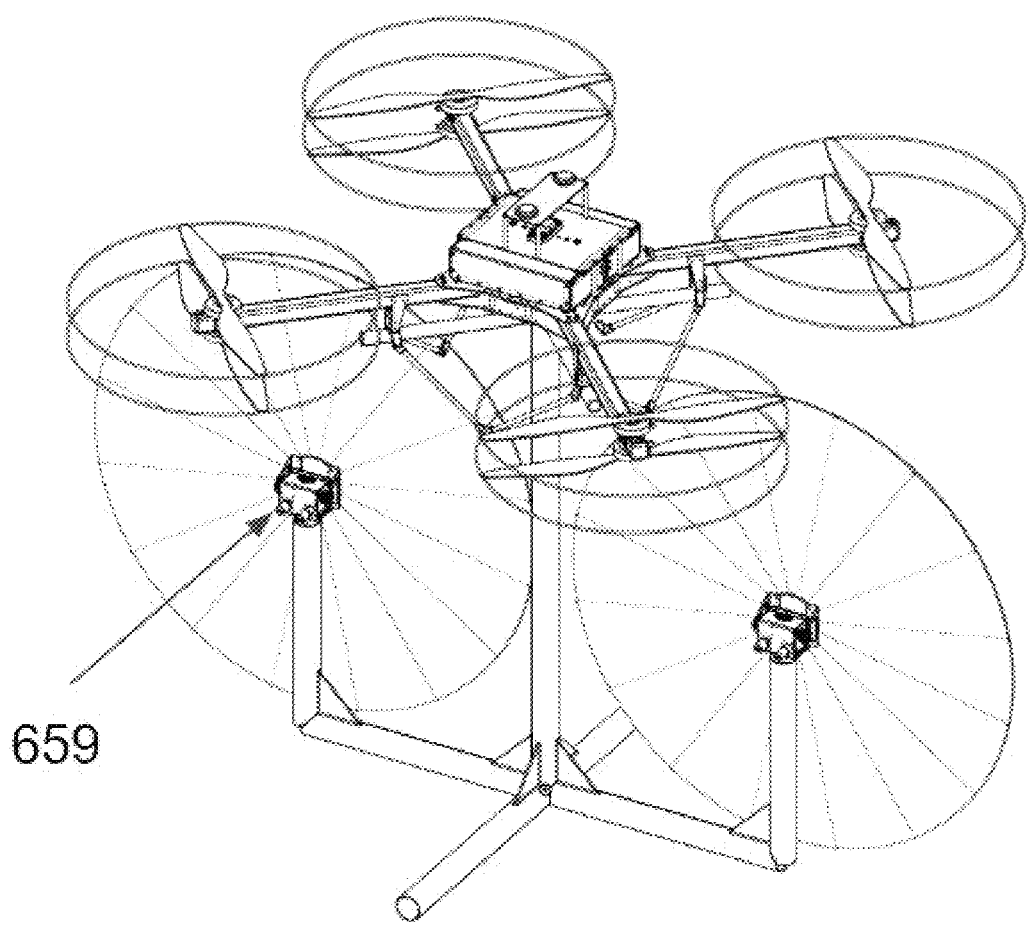
FIGS. 4A and 4B illustrate perspective views of a modular heliostat unit in accordance with an embodiment in a transport configuration and in a deployed configuration.
Figure 4B:
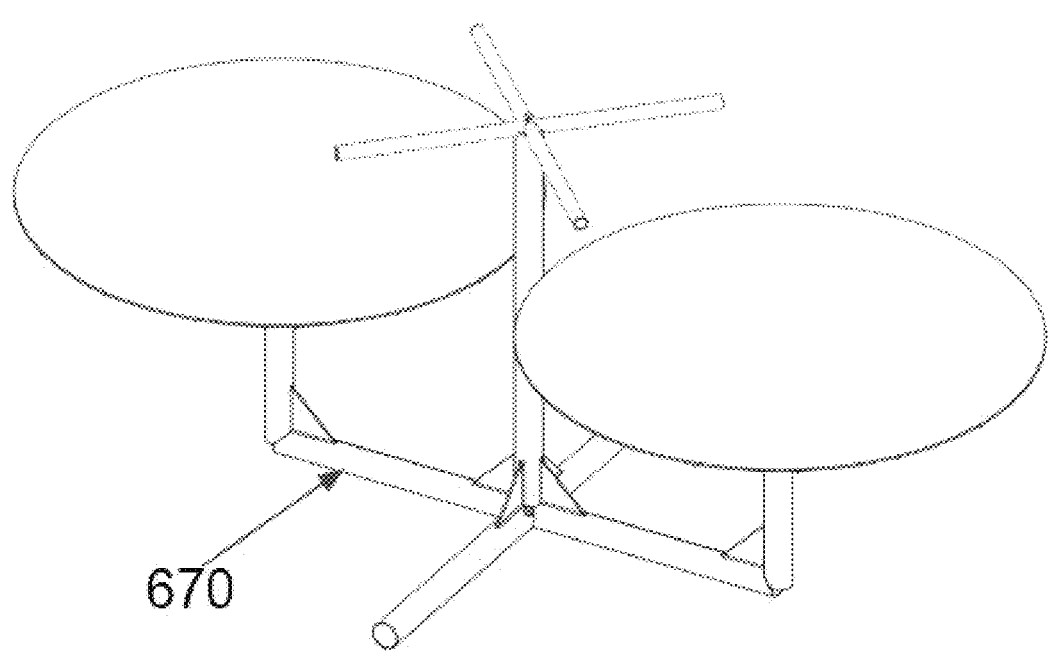

In embodiments, the heliostat is capable of orienting the mirror 661 in the altitude and azimuth directions with a range of 100 degrees and 360 degrees respectively. When the heliostats are being transported, the mirrors are oriented perpendicularly to the ground to avoid disturbing the flow of air from the vehicle's propellers, as shown in FIGS. 2A and 4A for two different types of stand. Once they are placed in the field, the mirrors are moved to their "home" position, with the mirror parallel to the ground, as shown in FIG. 2B and FIG. 4B. This orientation is ideal because it best protects the electronics and mechanism of the heliostat from sunlight and precipitation, as well as minimizes the chance of unwanted light concentration. All electronic control units are assembled and installed during the manufacturing of the heliostats. Upon deployment, the heliostats are powered on either with a physical switch or wirelessly via BLUETOOTH.

Figure 5A:
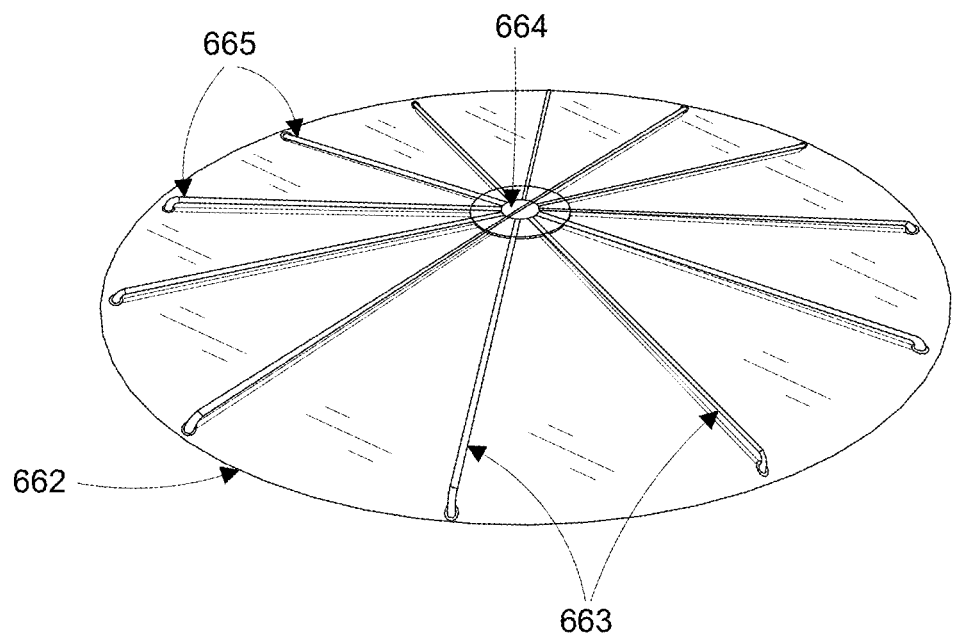
FIGS. 5A and 5B illustrate perspective views of an embodiment of a mirrored surface for a modular heliostat unit in an untensioned configuration and a tensioned (deployed) configuration.
Figure 5B:
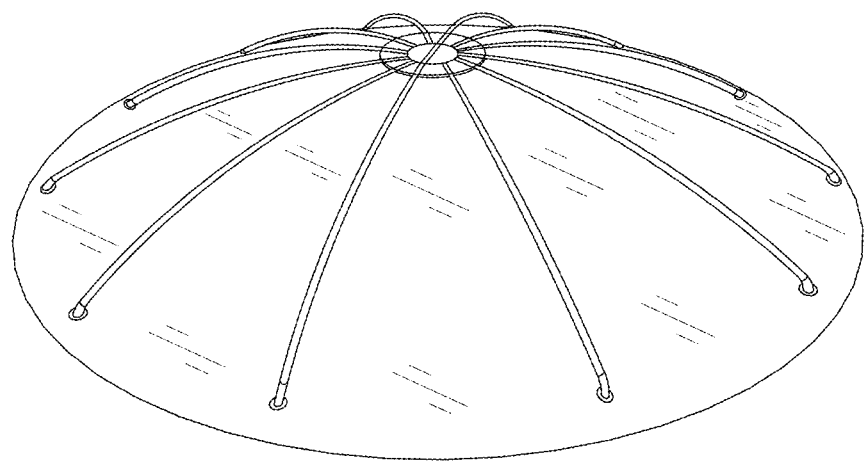

The mirrored surface is in many ways one of the most critical components of the heliostat unit. Traditional heliostat mirrors are made of metal and glass and require substantial support structures in order to keep them flat and in the proper position. Such mirrors and structures are quite heavy and are therefore not suited to the concept of deployment using small drones. In embodiments, the mirror is made of a flexible membrane tensioned using multiple composite or wooden bending members. As shown in FIG. 5A, a number of flexible bars or tubes 663 are attached to each other in a radial pattern like spokes on a wheel, at hub 664. Each bar 663 has a hook 665 attached at the end that is inserted into a grommet installed in the MYLAR or other suitable flexible reflective-coated polymer sheet 662. The reflecting sheet has a circular pattern of grommeted holes to accept these hooks. When all of the hooks are attached, and all of the bars are bent, the flexible mirror is tensioned uniformly through the circle of grommeted holes, as shown in FIG. 5B. When this type of flexible-mirror, tensioned-spoke design is employed with carbon fiber spokes, a 1-meter diameter, circular mirror can be constructed that weighs as little as 300 grams. The mirror can be transported in a very compact configuration as the support structure is entirely flat until it is tensioned by being bent onto the MYLAR sheet.

Figure 6A:
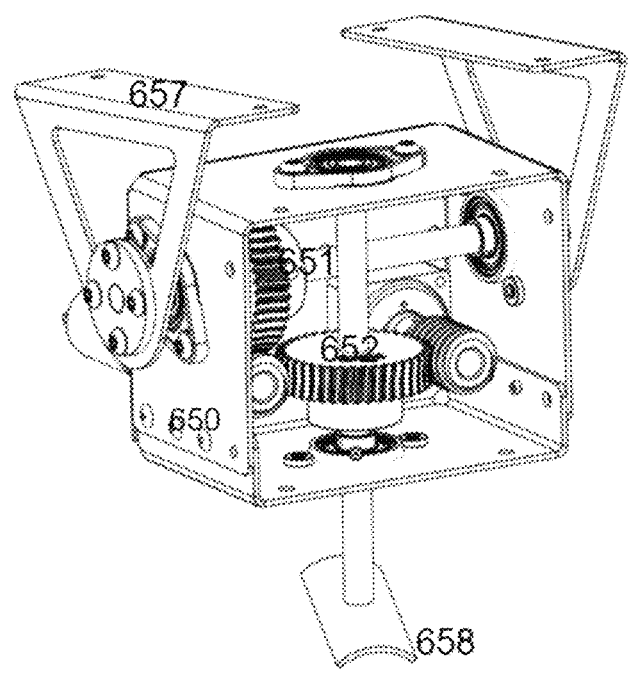
FIGS. 6A and 6B illustrate two perspective views of an embodiment of a heliostat drive unit.
Figure 6B:
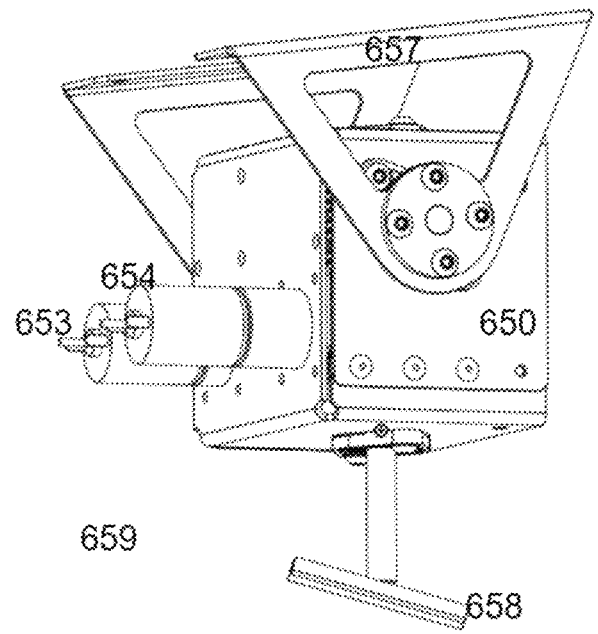
Figure 7A:
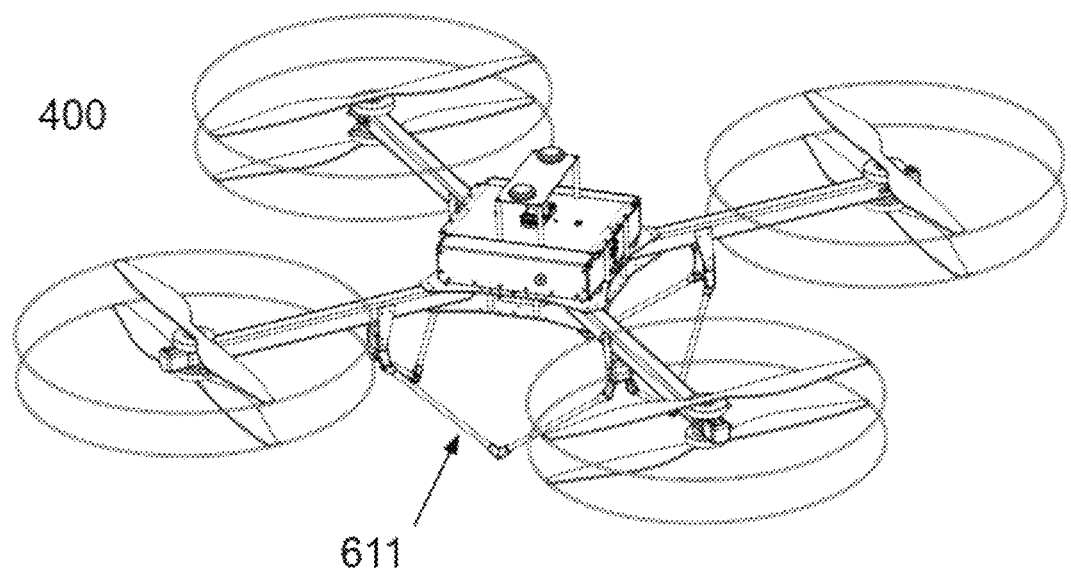
FIGS. 7A and 7B illustrate two perspective views of a multi-rotor drone in accordance with an embodiment.
Figure 7B:
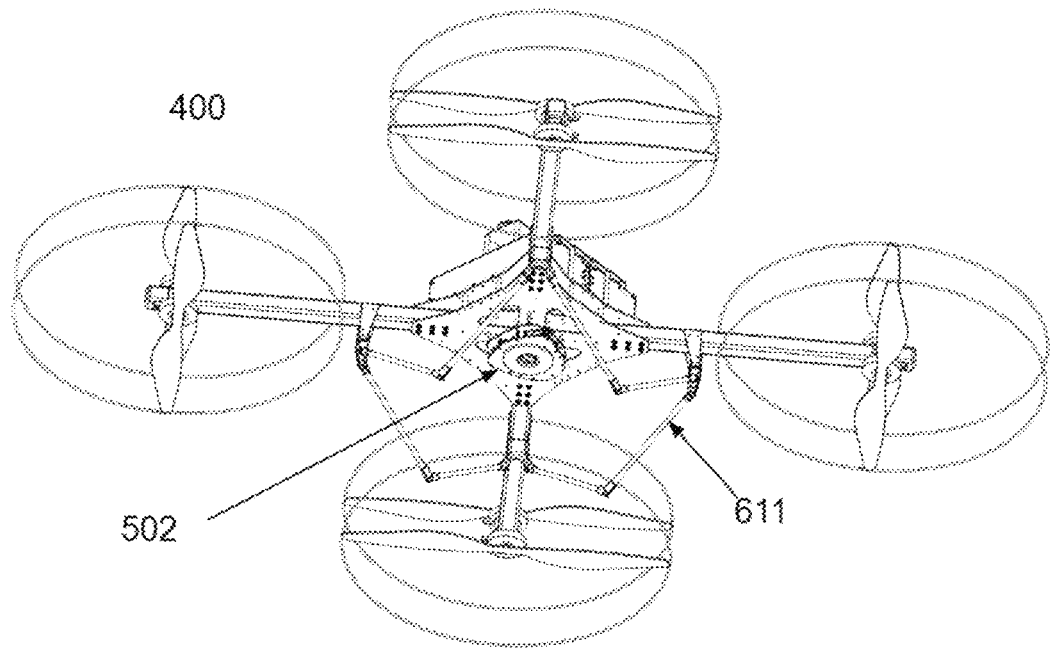
Figure 8A:
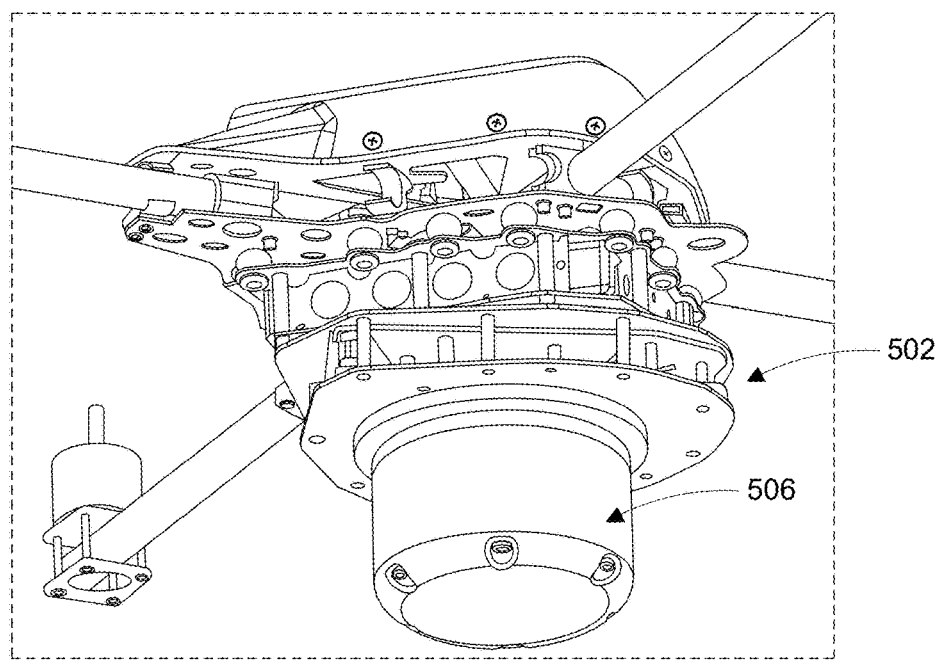
FIGS. 8A and 8B illustrate perspective views of a mating attachment mechanism in accordance with an embodiment showing a payload in a secured or released configuration relative to a drone.
Figure 8B:
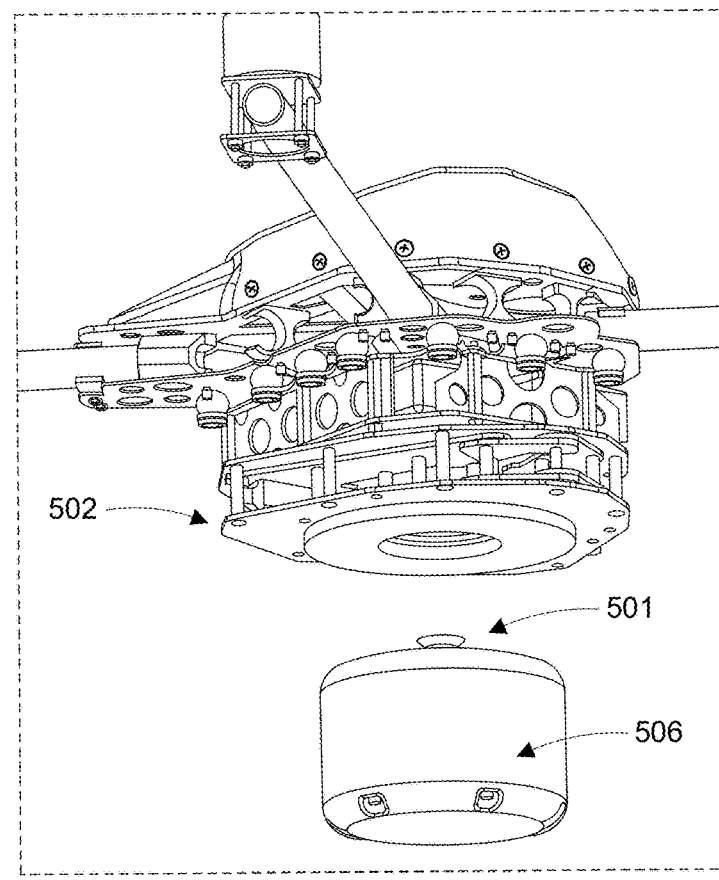
Figure 9A:
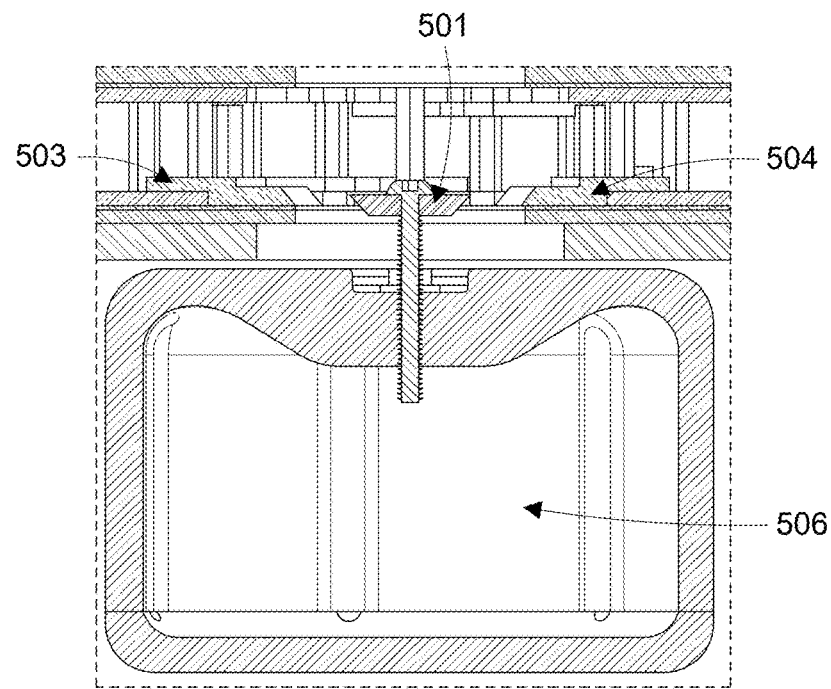
FIGS. 9A-9C are cutaway, time-lapse views of operation of the mating attachment mechanism for the multi-rotor drone for FIGS. 8A and 8B.
Figure 9B:
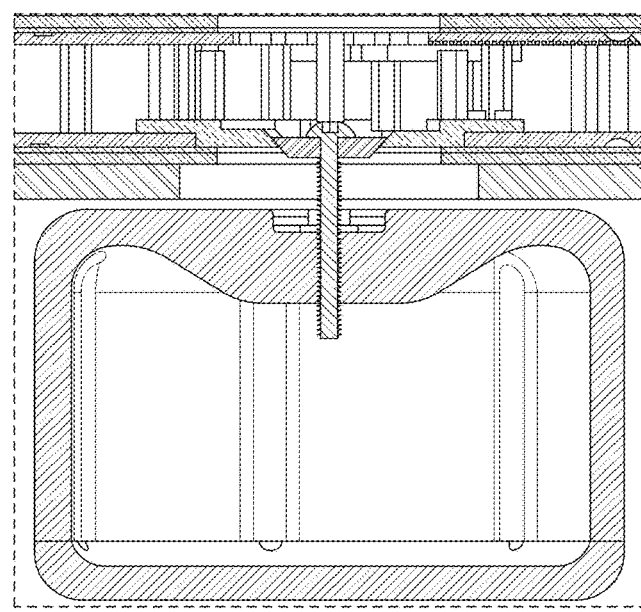
Figure 9C:
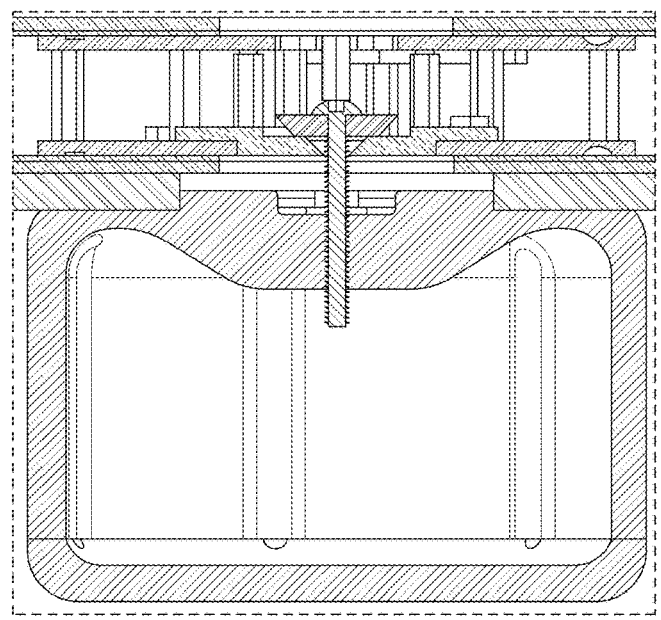
Figure 10A:
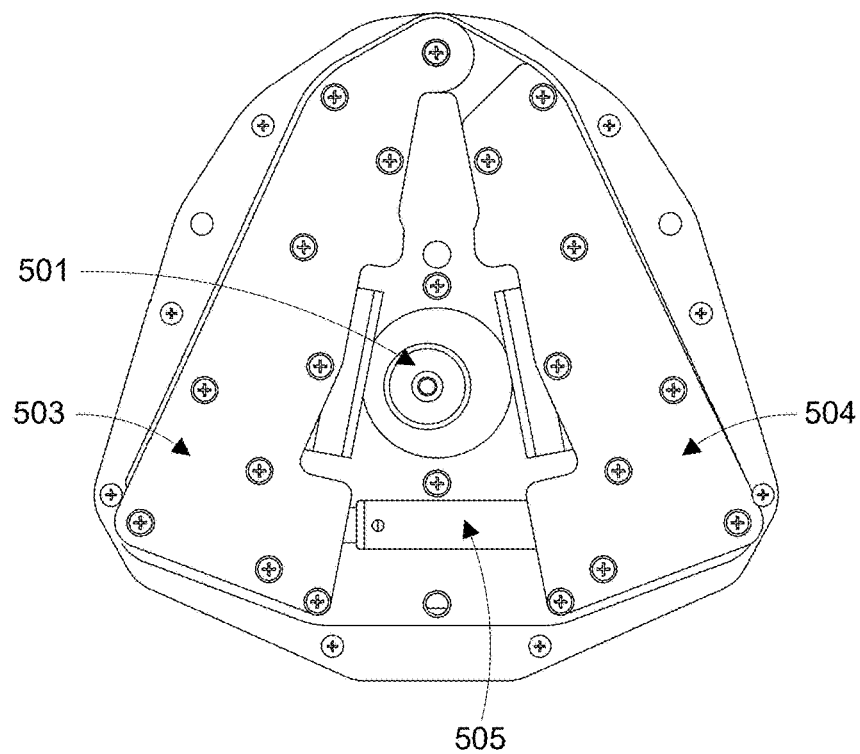
FIGS. 10A and 10B are top down, time-lapse views of operation of the mating attachment mechanism for the modular heliostat unit for FIGS. 8A and 8B.
Figure 10B:
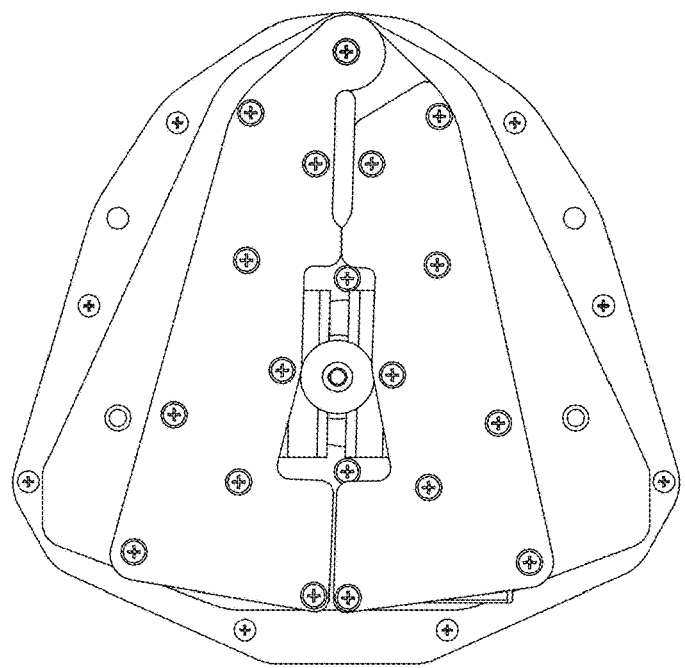

A lightweight mirror is also important for enabling lightweight drive and support structures. The large heliostats of conventional solar generation systems rely on custom built, precision drives for orienting the mirrors of a heliostat field. Small, lightweight mirrors can take advantage of smaller drives that use inexpensive, commodity components such as DC and stepper motors, worm gear sets, and prepackaged ball bearings. As shown in FIGS. 6A and 6B, the heliostat drive mechanism to support the 1-meter diameter circular tensioned mirror weighs as little as 400 grams.

Figure 20:
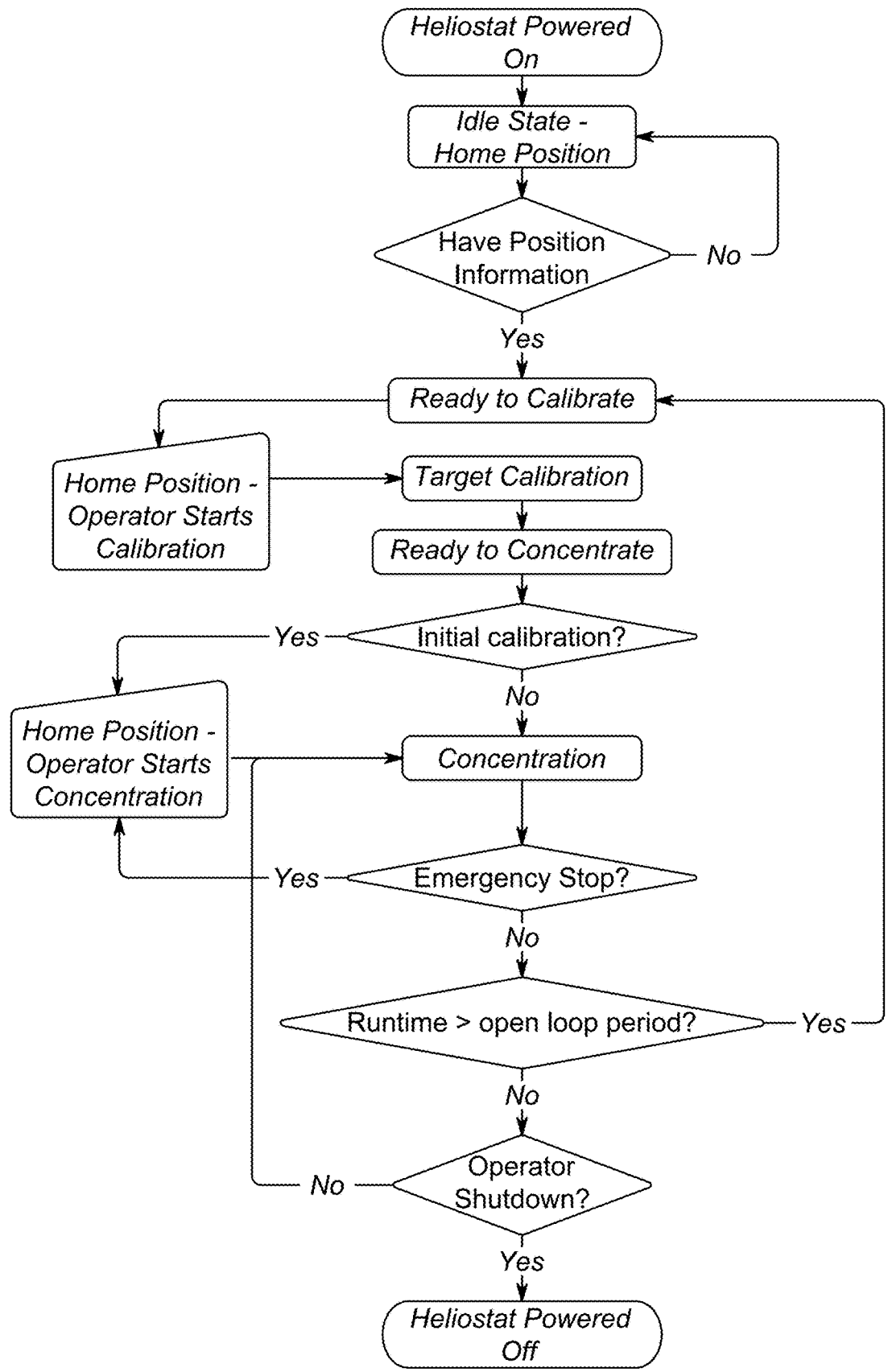
FIG. 20 is a flowchart illustrating basic heliostat software functionality in accordance with an embodiment.

In embodiments, there are three main parts to the control software of each heliostat as shown in FIG. 20. The sun tracking, the heliostat tracking, and the position controller. The sun tracking section of the software takes in the heliostat's location, in latitude and longitude coordinates, the heliostat's altitude, the heliostat's magnetic compass heading, and time and date as inputs. It uses these inputs to calculate the location of the sun as an orientation vector relative to the heliostat base, in altitude and azimuth coordinates. The heliostat tracking component takes this calculated sun position, and the position and altitude of the concentration target, and calculates the orientation of the mirror necessary to reflect the sunlight onto that target. The last component, the position controller, takes the desired azimuth and altitude angles as well as encoder feedback from the motors as inputs. In various embodiments, some elements of the software will reside on a centrally located server, and others will reside on a microcontroller installed in each heliostat that is in wireless communication with the central server.

In various embodiments, the heliostat/mirror support structure or stand 660 and 670 serves two purposes: support one or more heliostats 659 in as rigid and stable a position as possible while resting on the ground, and to securely hold the heliostats as they are transported aerially underneath a drone. The stand is physically the largest piece of equipment that must be deployed in the field. As with the tensioned mirrors, the stands are designed to be both lightweight, and collapsible for compact transportation.

Figure 3A:
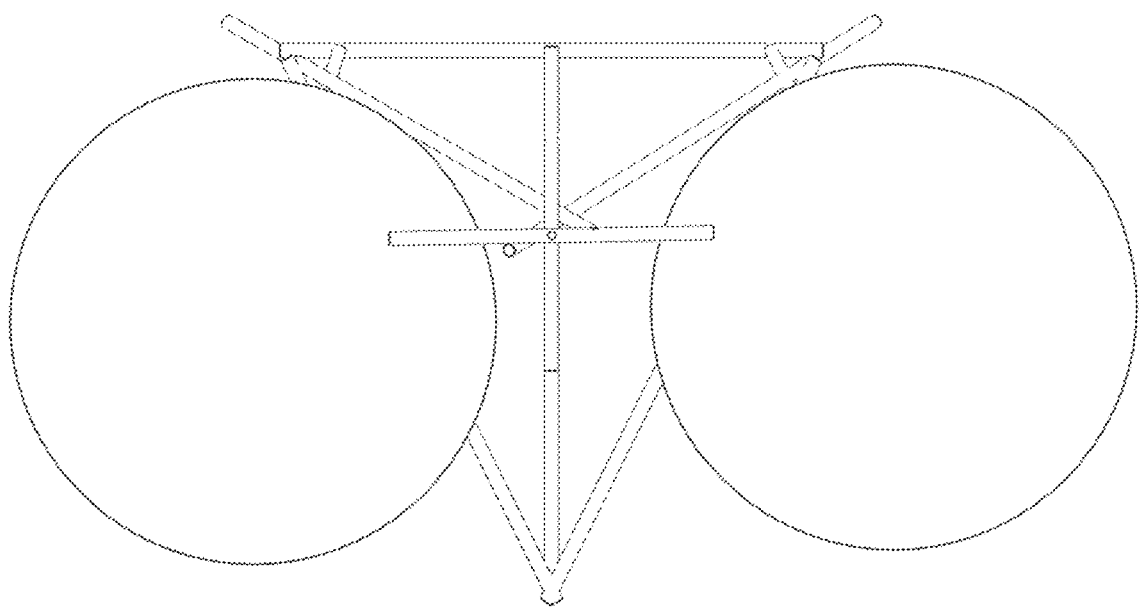
FIGS. 3A-3C are a top view, side view, and bottom view, respectively, of a modular heliostat unit in accordance with the embodiment shown in FIG. 2B.
Figure 3B:
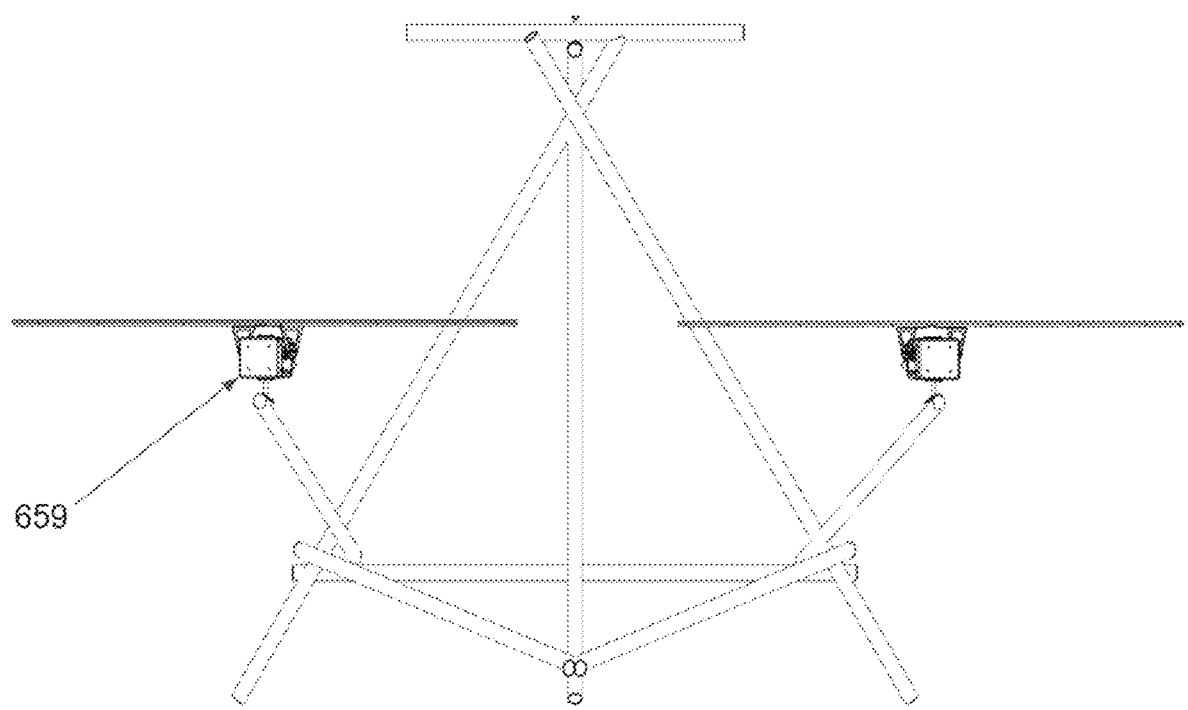
Figure 3C:
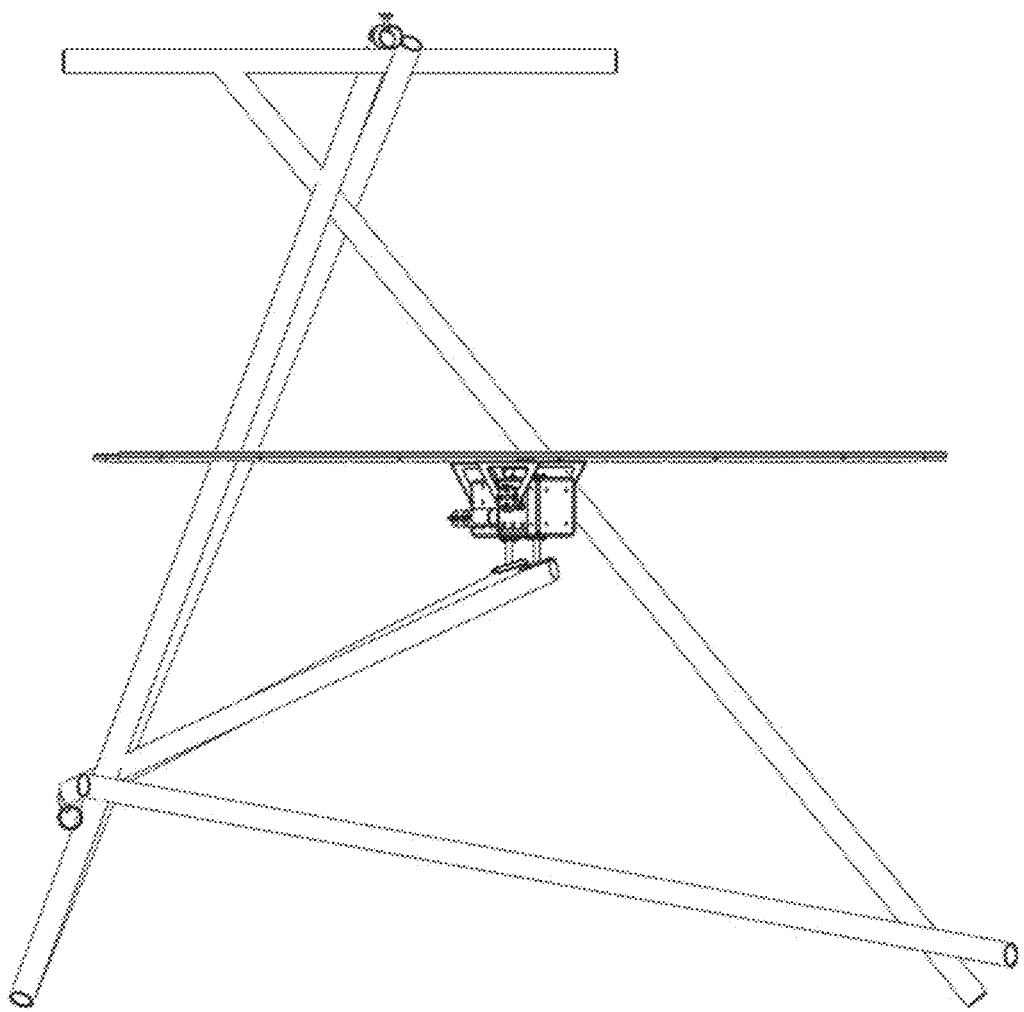

In one embodiment, shown in FIG. 2 and FIG. 3, the stand 660 employs an A-frame truss structure. It can be made of any kind of structural tubing-carbon fiber, aluminum, or even bamboo. Because it does not use any dimensioned tubular joints, this type of structure lends itself to irregular materials such as bamboo. Another version of the stand 670, as shown in FIG. 4B, uses slip joints and is made of either carbon fiber or aluminum tubing. In various embodiments, the methods of joining or attaching the frame elements are simple enough that they can be assembled either by unskilled labor, or by robots.

In accordance with various embodiments, deployment of the solar facility may involve the following steps:

First, the site is surveyed using a drone equipped with a LIDAR or other 3D terrain scanning device, as well as a precision positioning technology such as RTK GPS. This survey will result in a map of the terrain that is accurate to approximately 1 to 2 centimeters. Based on the survey map, computer-aided planning and optimization of facility layout is undertaken. A location is chosen for the central collector and processing modules, as well as for the drone docks 680, heliostat washers 690, heliostat staging modules 700, and energy usage modules 120. The geography of the terrain, as well as the seasonal paths that the sun traverses across the sky, is taken into account in optimizing the layout and orientation of the facility.

Access for the central area where the large modules will be located must be established. In various embodiments, depending on the specifics of the site, and the balance of human versus robotic involvement chosen for the facility, the site may be accessed by one or both of land or air access. An access road 108 could be built, and the modules could be trucked in. Alternatively, the modules could be airlifted by either manned helicopters, or by unmanned heavy lift drones using scaled-up iterations of the lifting techniques described elsewhere in this document.

Figure 15:
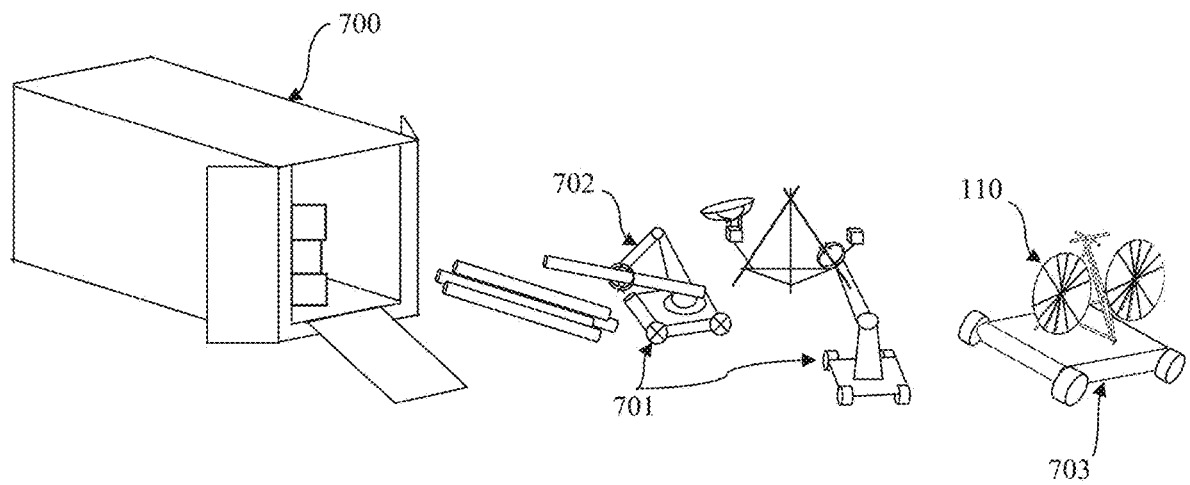
FIG. 15 illustrates a perspective view of heliostat assembly at a staging area in accordance with an embodiment.
Figure 16:
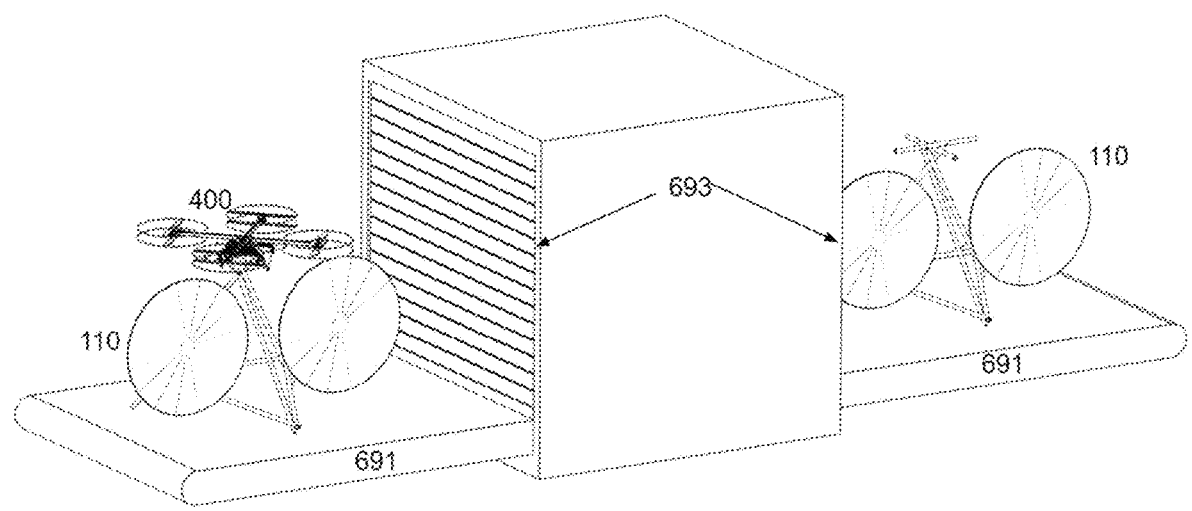
FIG. 16 illustrates a perspective view of a cleaning station in accordance with an embodiment.
Figure 17A:
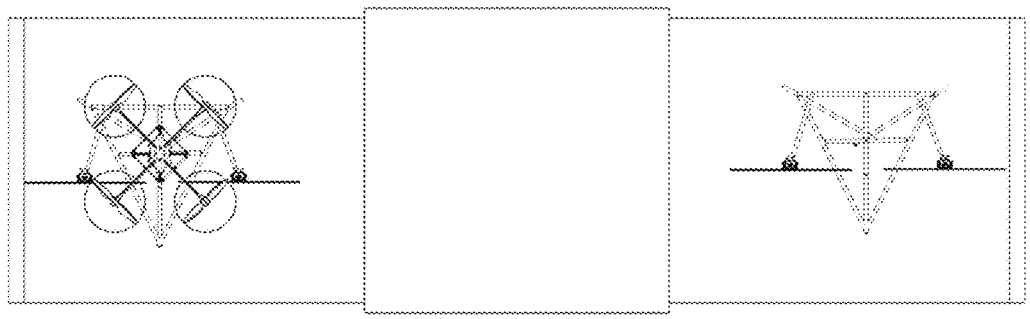
FIGS. 17A-17B are a top view and side view of the cleaning station in accordance with an embodiment.
Figure 17B:
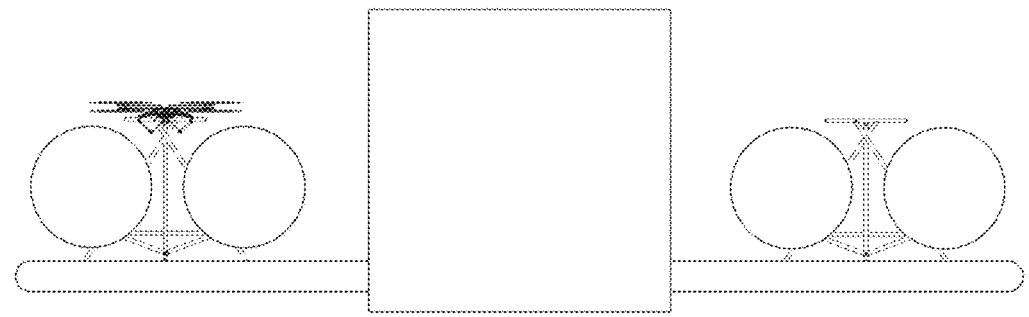
Figure 18:
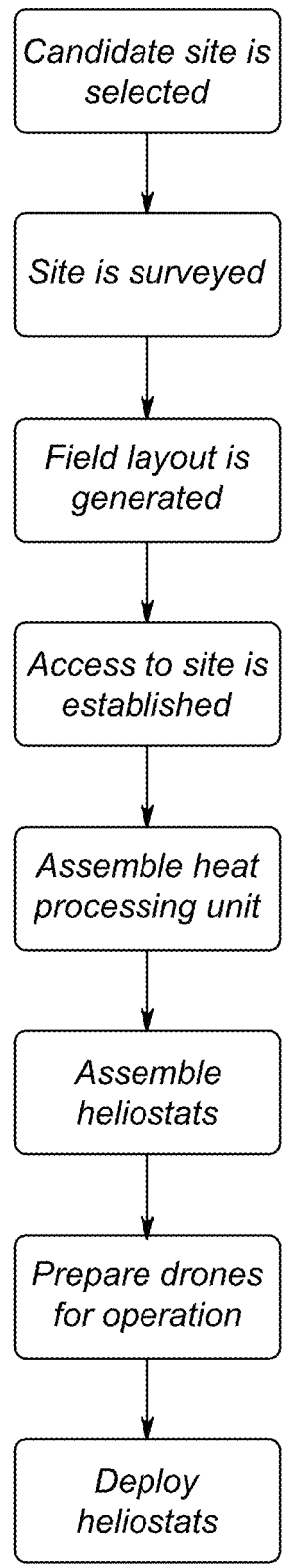
FIG. 18 is a flowchart showing the steps for deployment and assembly of the modular heliostat units in accordance with an embodiment.
Figure 19:
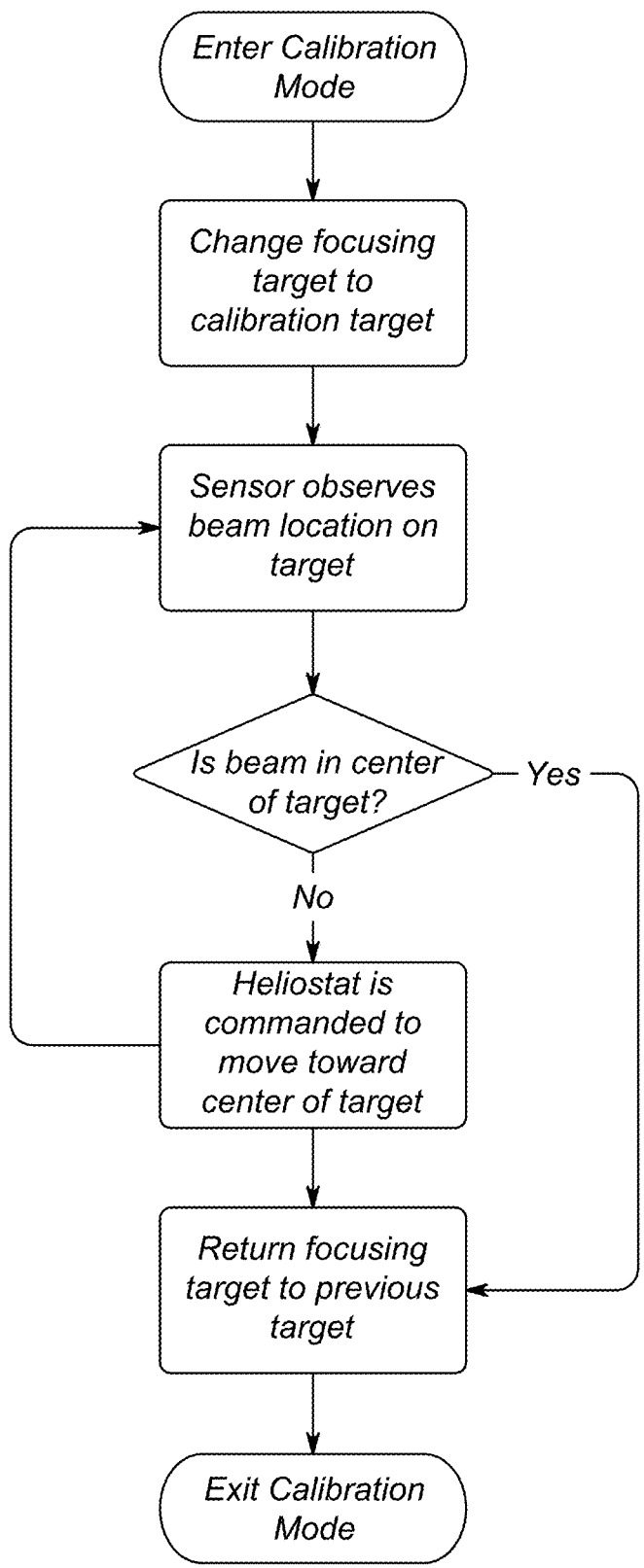
FIG. 19 is a flowchart showing the steps for the heliostat drive setup and calibration in accordance with an embodiment.

Once delivered to the site, the central heat processing or power generation, and energy use modules are assembled and interconnected. In various embodiments, the process of deploying the heliostats units in the heliostat field can be undertaken either by humans or robots. The first step in either scenario is to move in the module that is packed with the heliostat components to the site. These components include the folded, flat-packed tubular stands, the drive units, and the flat-packed tensioned flexible mirrors. In a version of the solar facility that is completely robotic, a few different types of either autonomous or teleoperated robots will be brought on site along with the heliostat components. In one embodiment, a four or six-wheeled machine 701 that can move across rough ground and carries one or two robotic arms 702 with gripper actuators, and/or fastener-driving actuators. As shown in the embodiment of FIG. 15, multiple sets of robots can cooperate to remove the heliostat components that comprise unit 110 from their storage module 700 and assemble them. Most assembly operations will involve joining two tubular members by holding them in place and driving a machine screw through a prepositioned hole and into an integral nut.

Figure 13:
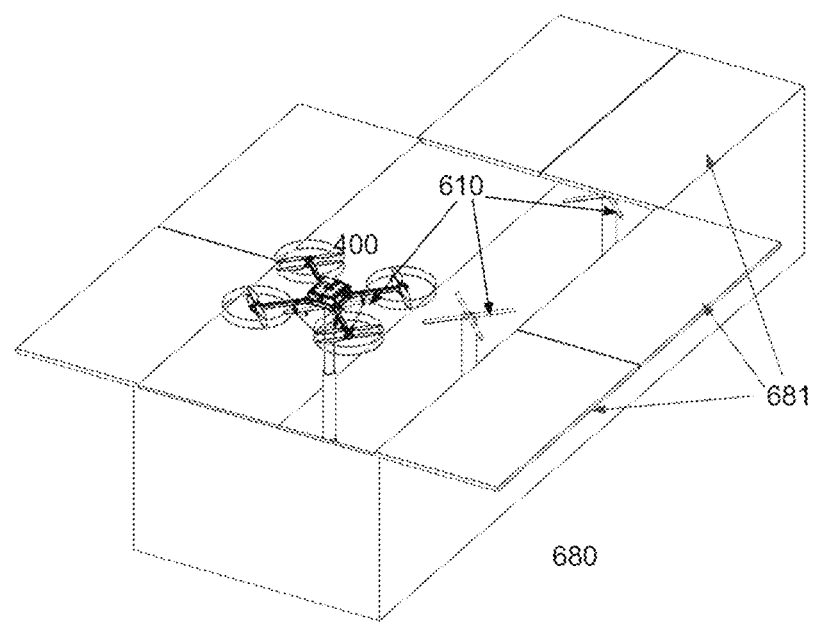
FIG. 13 illustrates a perspective view of a transportable base station for the multi-rotor drones in accordance with an embodiment.
Figure 14A:
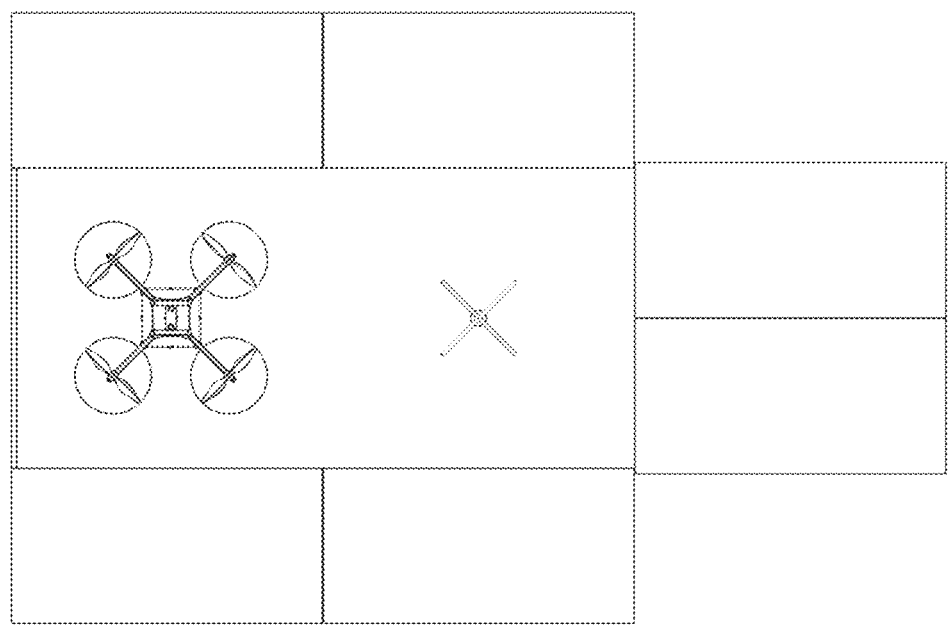
FIGS. 14A-14B are a top view and side view of the transportable base station in accordance with FIG. 13.
Figure 14B:
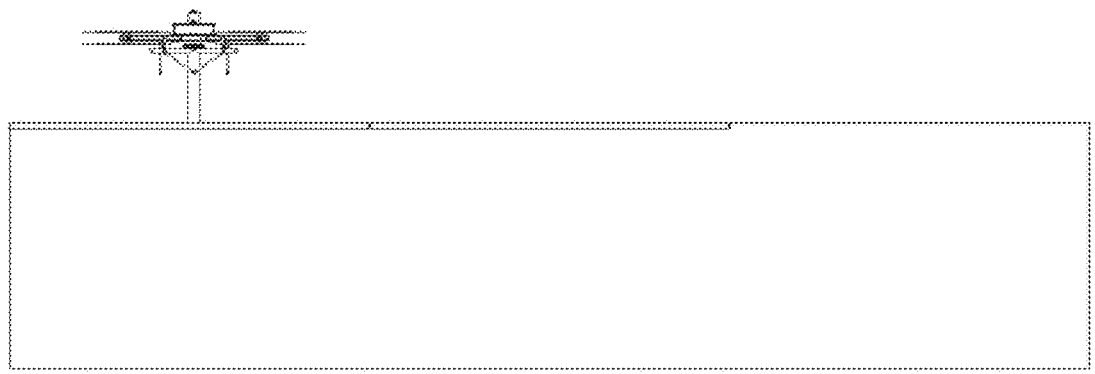

With the central area of the facility completed, the drones may be moved into the facility in their mobile base station module 680. In embodiments, the base station contains multiple drone landing and sheltering receptacles, with individually-closing retractable roofs as shown in FIG. 13 and FIGS. 14A and 14B. Inside each receptacle is a vertically-retractable perch 610, of the same type that is on each heliostat and that the drone uses to grip and perch on the heliostat stand. In the mobile base station, the perch includes electrical contacts that provide electricity to the drone for charging. As with the other central modules, the base station can be wired to the power output of the solar generation infrastructure. In some embodiments, the facility may include various photovoltaic and battery systems to provide temporary, backup up or augmented electrical power to the facility. In other embodiments, a gas-powered electrical generator for use during the facility construction phase. To launch a drone, the roof 681 retracts, and the perch 610 with the drone 400 on it moves upwards enough so that the drone's propellers are fully clear of the roof.

In embodiments, the base station 680 contains a central server that generates and transmits commands to the drones via a mesh radio network. This server uses the survey map and heliostat layout plan to generate waypoint missions that direct each drone to pick up and drop off as many heliostats as a drone can, given its known battery capacity, flight delivery paths and weather conditions, for example. To do this, it takes into account the distances that will be travelled by the drone to and from the heliostat locations, the terrain, and the wind velocity to optimize the flight path of the drone to maximize the number of heliostats deployed.

If the heliostats are being assembled robotically, the robots doing the assembly will set the heliostats out in a line of pre-measured marked locations, where they will await pickup by drone. If they are being assembled by human workers, the workers might place each completed heliostat onto a flatbed crawler 703, as shown in FIG. 15, so that it can be driven to a safe distance away from people to a designated location to be picked up by the drone. When at the designated location, the drone descends onto the perch. In addition to relying on a precision positioning source such as RTK GPS, the drone has a downward-pointing camera that can recognize the shape of the heliostat perch and adjust the course of the drone to mate with it. If sudden winds disturb the drone enough in the final descent stage that it cannot safely mate with the perch, the camera system detects this and the drone will ascend again and repeat the descent. Once the drone has safely landed on the perch, it powers down the motors, and engages the gripper mechanism. It then powers the motor back up and takes off with the heliostat. It then transits directly to the designated deployment location of the heliostat. It then descends slowly. As with the landing, the drone will monitor its attitude during the final descent stage with the heliostat to detect if the heliostat gets caught on an obstacle or if one of its legs is in an undetected hole, which could cause it to topple. If this is detected, the drone can quickly release the heliostat before the toppling could cause the drone to crash.

In embodiments, when the heliostat has landed in position, the final step is for the drone to send its actual position, which might be slightly off from the predicted position, to the central server. This accurate "as built" position will be used for the motion calculations for that heliostat. After dropping off a heliostat, the drone returns to the staging location to pick up another heliostat, until it exhausts its battery. When this occurs, it returns to the base station module, lands on the perch, and recharges. Another drone then takes off from one of the other receptacles on the base station module and continues the heliostat deployment operation.

In embodiments, the units in the central area 102 of the facility 100 may include a cleaning module 690 that is used to periodically remove environmental contamination that reduces the reflectivity of the mirrored surface. The cleaning module is located at the central staging area and gets power from the generation apparatus like the other central modules. It is built around a conveyor belt 691 that is wide enough to carry an assembled heliostat unit 110. The cleaning module has an enclosure 692 in the middle, with two vertical doors 693 on either side. The conveyor belt runs through the enclosure doors, so that a heliostat unit 110 can be dropped off on one side by drone, conveyed into the enclosure with the doors open, washed inside the enclosure with the doors closed, and then conveyed out to the other side to be picked up by drone. The cleaning apparatus inside uses a series of directed high-pressure water jets that spray directly onto the mirrors. After this, compressed air is sprayed on the mirrors to dry them. The water drains down into a collection pan in the bottom of the enclosure, is filtered, and reused. A tank of replacement water is used only to compensate for evaporative losses, which are minimized thanks to the well-sealed cleaning chamber.

In embodiments, one type of energy utilization module may be an agricultural module. Produce can be grown in intensive, high-density installations featuring controlled artificial lighting, irrigation, and a controlled atmosphere. As in the case of the server farm modules, the plant growing operation can economize by using electricity at the point of generation, before transmission losses. With a controlled-environment module, economy is gained through density. It is important to pack as many plants as possible under the lights, and in the atmosphere that has been humidified and enriched with gases such as carbon dioxide. It is also important to preserve this atmosphere by keeping it sealed from the outside environment. In certain special cases, it is desirable to maintain a nearly sterile environment in the plant cultivation area.

Figure 21:
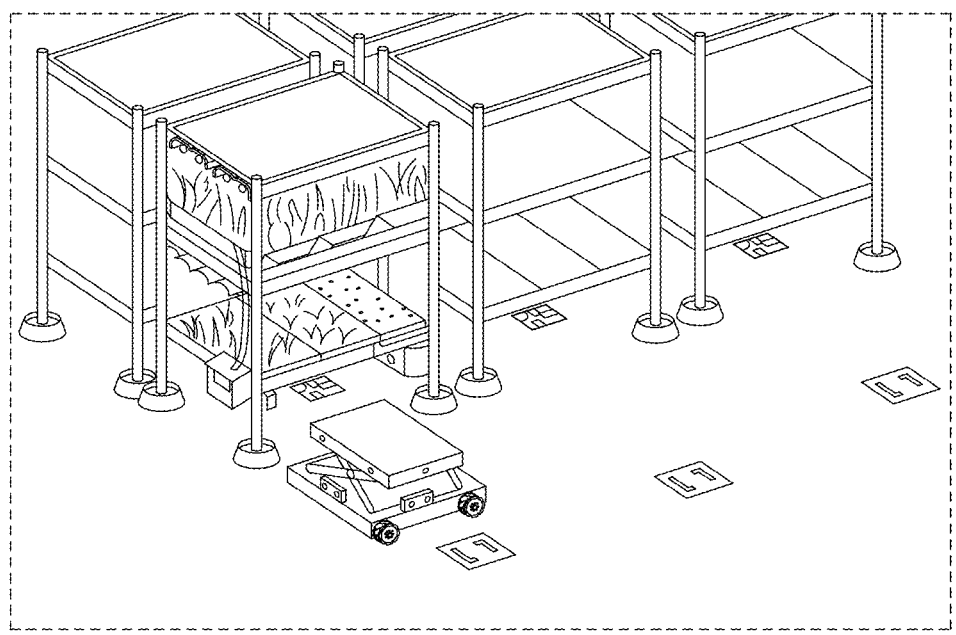
FIG. 21 illustrates a perspective view of movable plant growing shelves in accordance with an embodiment.
Figure 22:
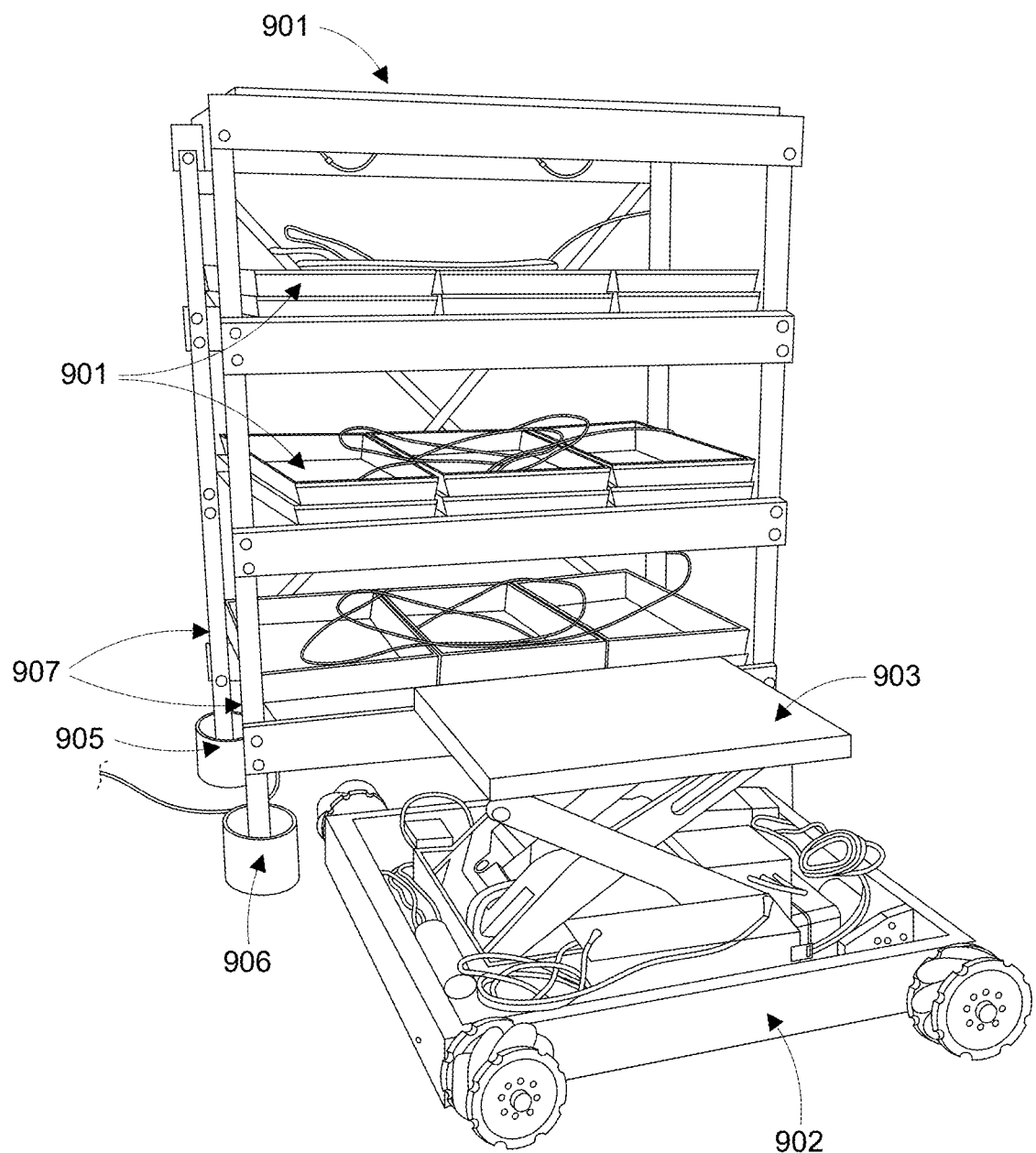
FIG. 22 illustrates a perspective view of a crawler robot with integral lifting apparatus for lifting and moving plant growing shelves in accordance with an embodiment.
Figure 23:
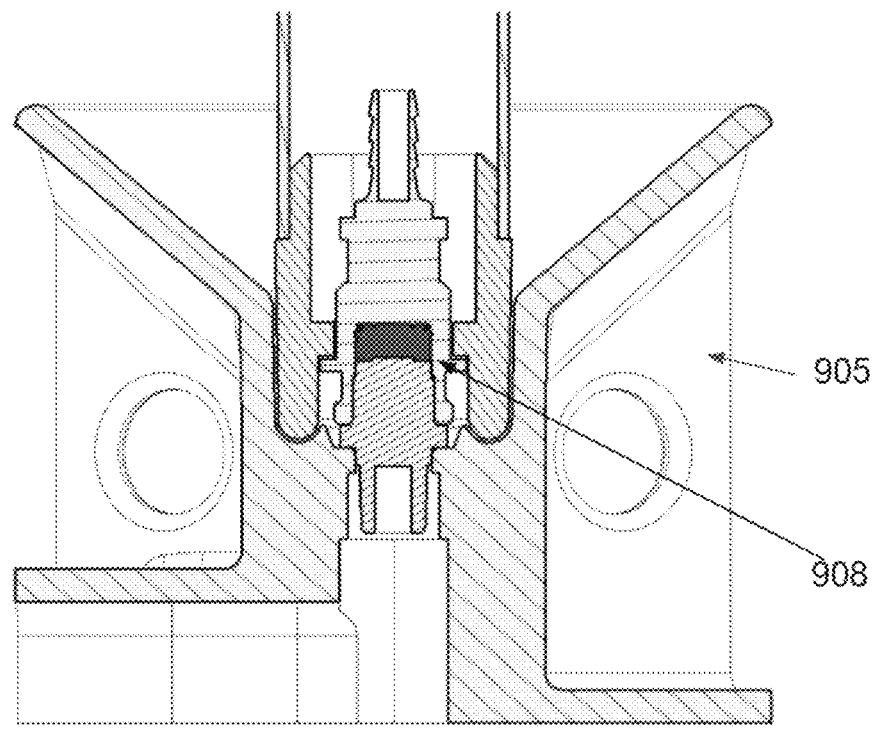
FIG. 23 illustrates a cutaway view of a water-transmitting leg mating receptacle for movable plant growing shelves in accordance with an embodiment.
Figure 24:
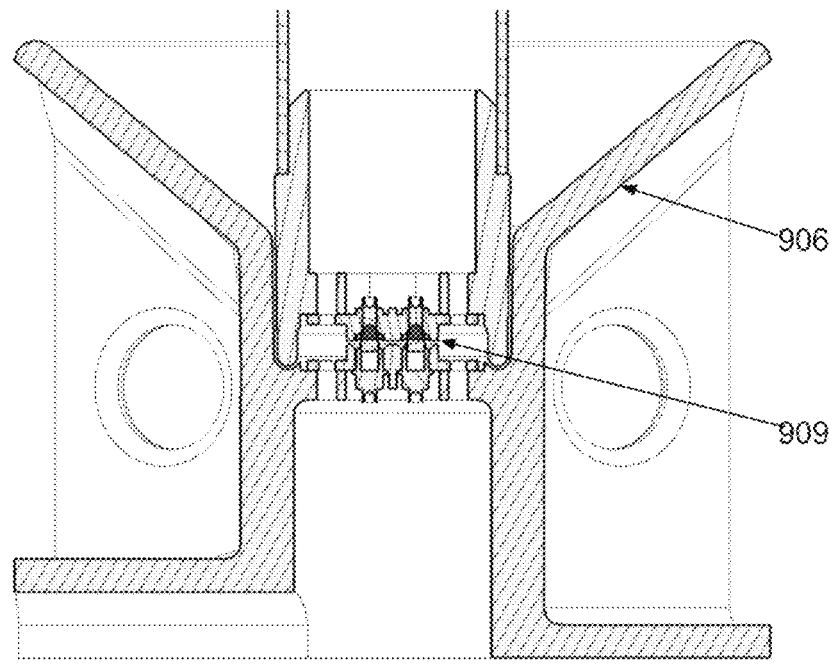
FIG. 24 illustrates a cutaway view of a power-transmitting leg mating receptacle for movable plant growing shelves in accordance with an embodiment.

As shown in FIGS. 21 and 22, an embodiment of the plant growing module can be configured to address the containment and density problem by utilizing plant growing racks that can be moved by a wheeled robot that can drive underneath them. The racks contain multiple levels of plant growing containers, each of which is provided with lighting, irrigation, and environmental and soil monitoring equipment.

A unique aspect of various embodiments of the rack design for an agricultural module is that the water and power connections are automatically made when the robot lowers the rack into pre-installed receptacles. Each receptacle is conical, to guide the legs of the shelf into the proper position. Some of the legs contain double shutoff valves for irrigation water, while others contain spring-loaded electrical contacts to power lights, irrigation valves, and monitoring equipment. To relocate the shelf, a wheeled crawler robot simply rolls underneath it, and actuates a lifting jack. As it lifts up a few inches and the shelf legs clear the cone receptacles, the water and power connections are disconnected, and the robot can roll the shelf to another location with another set of cone receptacles. The advantage of such an arrangement is that shelves can be packed very closely into a space, without needing to leave access rows for people or robots to pass through. By continuously repositioning all the racks, it is possible to periodically rotate each individual rack in a sealed grow space into an airlock, where it can be removed from the sealed environment for maintenance or harvesting.

Persons of ordinary skill in the relevant arts will recognize that embodiments may comprise fewer features than illustrated in any individual embodiment described above. The embodiments described herein are not meant to be an exhaustive presentation of the ways in which the various features of the embodiments may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

The invention claimed is:

1. A drone deployable modular system for remote solar energy generation comprising:
   one or more remote-controlled multi-rotor drones configured to deliver a set of modular heliostat units to be assembled into a heliostat field at a location remote from a location from where the remote-controlled multi-rotor drones are deployed, the heliostat field having a generally peripheral arrangement of the set of modular heliostat units around a centrally-located concentrating solar collector/energy utilization system to provide reflected solar energy to the centrally-located concentrating solar collector/energy utilization system,
   wherein each of the one or more remote-controlled multi-rotor drones is selected from drones including a battery powered rechargeable vertical take-off and landing craft having a flight duration of between 10-60 minutes, a total travel range of between 1-20 km, and a payload of between 1-100 kg,
   wherein each of the set of the modular heliostat units includes at least one frame structure that supports a tensioned mirrored surface and an attachment mating mechanism at an upper portion of the modular heliostat unit that is configured to be selectively releasably attached to one of the remote-controlled multi-rotor drones, each frame structure being operably connected to and controlled by a heliostat driver mechanism at an opposite side of a center of the mirrored surface, such that each mirrored surface is configured to be selectively positioned by the heliostat driver mechanism in a generally vertically-oriented transport position and in a generally horizontally-oriented home position once deployed in the heliostat field, and each modular heliostat unit having a weight of between 1-20 kg and a volume of up to 27 m$^3$ when positioned in the home position; and
   wherein the each of the set of the modular heliostat units includes a selectively deployable stand structure with an upper portion forming at least a portion of the attachment mating mechanism, wherein the stand structure comprises multiple tube members operably joined together at attachment points with a cross-shaped perch structure at the upper portion that is operably configured for the remote-controlled multi-rotor drones to land on and selectively engage the cross-shaped perch structure to facilitate pick up and drop off of the modular heliostat unit.

2. The drone deployable modular system of claim 1, wherein each mirrored surface comprises a reflective polyester PET film tensioned over at least a portion of the frame structure.

3. The drone deployable modular system of claim 1, wherein each modular heliostat unit includes a pair of frame structures each having a mirrored surfaces with a diameter of less than 1m that are selectively positioned in the generally vertically-oriented transport with the mirrored surfaces of the pair of frame structures parallel to one another.

4. The drone deployable modular system of claim 1, wherein the home position is a generally horizontal-oriented position with the mirrored surface facing downward to minimize wear and wind resistance.

5. The drone deployable modular system of claim 1, wherein each modular heliostat unit once deployed in the heliostat field is configured to be selectively controllable by the heliostat driver mechanism from the home position to one of a set of selectively configured operable positions in which the mirrored surface is oriented by the heliostat driver in altitude and azimuth directions within a range of 0-100 degrees and 0-360 degrees, respectively.

6. The drone deployable modular system of claim 1, wherein the each of the set of the modular heliostat units includes the selectively deployable stand structure with the upper portion forming at least a portion of the attachment mating mechanism and a lower portion configured to support the modular heliostat unit in the heliostat field.

7. The drone deployable modular system of claim 6, wherein each heliostat driver mechanism comprises a body housing a set of motors and corresponding gears controlled by a battery-powered remote-controlled computer processor that is configured to position the frame structure via a selectively controllable, pivotable mounting point operably connected to the stand structure on the opposite side of the center of the mirrored surface.

8. The drone deployable modular system of claim 1, wherein each of the set of modular heliostat units further comprises an anchor system.

9. The drone deployable modular system of claim 8, wherein the anchor system further comprises an anchor attachment mechanism.

10. The drone deployable modular system of claim 1, wherein the cross-shaped perch structure is horizontally-oriented.

11. The drone deployable modular system of claim 1, wherein the attachment mating mechanism comprises a circular knob.

12. The drone deployable modular system of claim 11, wherein the circular knob comprises an edge beveled downward.

13. The drone deployable modular system of claim 1, wherein the attachment mating mechanism comprises a knob mounted in the center of the cross-shaped perch structure.

* * * * *